(12) United States Patent
Peng et al.

(10) Patent No.: US 11,412,414 B2
(45) Date of Patent: *Aug. 9, 2022

(54) COMMUNICATION METHODS AND COMMUNICATIONS APPARATUSES

(71) Applicant: HUAWEI TECHNOLOGIES CO., LTD., Guangdong (CN)

(72) Inventors: Wenjie Peng, Shanghai (CN); Hongzhuo Zhang, Shanghai (CN); Mingzeng Dai, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 5 days.

This patent is subject to a terminal disclaimer.

(21) Appl. No.: 16/916,529

(22) Filed: Jun. 30, 2020

(65) Prior Publication Data

US 2020/0336939 A1 Oct. 22, 2020

Related U.S. Application Data

(63) Continuation of application No. 16/566,436, filed on Sep. 10, 2019, now Pat. No. 10,743,213, which is a (Continued)

(30) Foreign Application Priority Data

Aug. 11, 2017 (CN) .......................... 201710687801.3

(51) Int. Cl.
*H04W 28/08* (2009.01)
*H04W 68/00* (2009.01)
(Continued)

(52) U.S. Cl.
CPC ....... *H04W 28/085* (2013.01); *H04W 68/005* (2013.01); *H04W 80/02* (2013.01);
(Continued)

(58) Field of Classification Search
CPC ... H04W 28/285; H04W 24/00; H04W 43/06; H04W 43/062; H04W 43/067; H04W 36/0027; H04W 36/0069
See application file for complete search history.

(56) References Cited

U.S. PATENT DOCUMENTS

2008/0062966 A1* 3/2008 den Hartog ............. H04L 12/66
370/352
2012/0093029 A1 4/2012 Foster
(Continued)

FOREIGN PATENT DOCUMENTS

CA 2877965 * 7/2013 ............ H04W 76/04
CN 101247238 A 8/2008
(Continued)

OTHER PUBLICATIONS

Office Action issued in Chinese Application No. 201710687801.3 dated Mar. 3, 2021, 12 pages.
(Continued)

*Primary Examiner* — Warner Wong
(74) *Attorney, Agent, or Firm* — Fish & Richardson P.C.

(57) ABSTRACT

This application provides a communication method and a communications apparatus. The communication method includes: receiving, by a core network device a message indicating a first data volume of first data transmitted between a second network device and a terminal device; determining, by the core network device, a total data volume of total data transmitted between a first network device and a core network comprising the core network device or total data transmitted between a second network device and the core network; and determining, by the core network device, a second data volume of second data transmitted between the first network device and the terminal device based on the first data volume and the total data volume, wherein the first (Continued)

data, the second data and the total data are data of a bearer, data of a flow, or data of a session.

24 Claims, 12 Drawing Sheets

Related U.S. Application Data continuation of application No. PCT/CN2018/099615, filed on Aug. 9, 2018.

(51) Int. Cl.
  *H04W 80/02* (2009.01)
  *H04W 80/08* (2009.01)
  *H04W 84/20* (2009.01)
  *H04W 36/00* (2009.01)
(52) U.S. Cl.
  CPC ........ *H04W 80/08* (2013.01); *H04W 36/0027* (2013.01); *H04W 36/0069* (2018.08); *H04W 84/20* (2013.01)

(56) References Cited

U.S. PATENT DOCUMENTS

| | | | |
|---|---|---|---|
| 2013/0176988 A1* | 7/2013 | Wang | H04W 36/08 370/331 |
| 2013/0201841 A1 | 8/2013 | Zhang et al. | |
| 2014/0010207 A1 | 1/2014 | Horn et al. | |
| 2014/0204771 A1 | 7/2014 | Gao et al. | |
| 2015/0045032 A1 | 2/2015 | Tomici et al. | |
| 2015/0215945 A1* | 7/2015 | Hsu | H04W 72/0486 370/254 |
| 2015/0326456 A1 | 11/2015 | Dudda et al. | |
| 2016/0134702 A1 | 5/2016 | Gertner | |
| 2016/0157265 A1* | 6/2016 | Lee | H04W 72/0413 370/329 |
| 2016/0212661 A1 | 7/2016 | Mallick et al. | |
| 2016/0227433 A1* | 8/2016 | Lee | H04W 72/1242 |
| 2016/0262149 A1* | 9/2016 | Futaki | H04W 16/32 |
| 2016/0330752 A1* | 11/2016 | Kato | H04W 72/10 |
| 2016/0374036 A1 | 12/2016 | Wang et al. | |
| 2017/0013498 A1* | 1/2017 | Yi | H04W 28/0278 |
| 2017/0055172 A1* | 2/2017 | Takahashi | H04W 24/08 |
| 2017/0086254 A1 | 3/2017 | Lee et al. | |
| 2017/0111911 A1 | 4/2017 | Uchino et al. | |
| 2017/0142683 A1 | 5/2017 | Wu et al. | |
| 2017/0196018 A1 | 7/2017 | Zeng et al. | |
| 2017/0222876 A1 | 8/2017 | van der Velde et al. | |
| 2017/0230867 A1 | 8/2017 | Hayashi | |
| 2017/0311200 A1 | 10/2017 | Koskinen et al. | |
| 2017/0359854 A1* | 12/2017 | Chiba | H04W 88/06 |
| 2018/0049062 A1 | 2/2018 | Sirotkin et al. | |
| 2018/0115921 A1* | 4/2018 | Chen | H04W 28/0257 |
| 2018/0199365 A1* | 7/2018 | Yi | H04W 72/1284 |
| 2018/0220326 A1* | 8/2018 | Nagasaka | H04W 28/0278 |
| 2018/0227723 A1* | 8/2018 | Takahashi | H04W 92/12 |
| 2018/0375776 A1 | 12/2018 | Hsu et al. | |
| 2019/0028918 A1* | 1/2019 | Zhu | H04W 24/10 |
| 2019/0052582 A1* | 2/2019 | Gaal | H04W 88/06 |
| 2019/0069313 A1 | 2/2019 | Kim et al. | |
| 2019/0124551 A1* | 4/2019 | Loehr | H04W 72/0486 |
| 2019/0124552 A1* | 4/2019 | Yan | H04W 28/08 |
| 2019/0124553 A1 | 4/2019 | Uchino et al. | |
| 2019/0208380 A1 | 7/2019 | Shi et al. | |
| 2019/0320339 A1* | 10/2019 | Laselva | H04W 52/246 |
| 2019/0357075 A1 | 11/2019 | van der Velde et al. | |
| 2020/0195784 A1* | 6/2020 | Shen | H04M 15/66 |
| 2020/0205213 A1* | 6/2020 | Marco | H04W 76/15 |

FOREIGN PATENT DOCUMENTS

| | | | | |
|---|---|---|---|---|
| CN | 102202419 A | 9/2011 | | |
| CN | 102461069 A | 5/2012 | | |
| CN | 103249078 A | 8/2013 | | |
| CN | 104581948 A | 4/2015 | | |
| CN | 104797000 A | 7/2015 | | |
| CN | 106063326 A | 10/2016 | | |
| CN | 106332175 A | 1/2017 | | |
| CN | 106454946 A | 2/2017 | | |
| CN | 106797581 A | 5/2017 | | |
| EP | 3331265 A1 | 6/2018 | | |
| FR | 2881306 A1 | 7/2006 | | |
| FR | 2881308 A1 | 7/2006 | | |
| KR | 2018107664 | * | 3/2017 | ........... H04W 24/08 |
| RU | 2565583 C1 | 10/2015 | | |
| RU | 2622110 C2 | 6/2017 | | |
| WO | WO2015/155598 | * | 3/2015 | |
| WO | 2016019543 A1 | 2/2016 | | |
| WO | WO2016/019833 | * | 2/2016 | ........... H04W 72/04 |
| WO | WO2018/059704 | * | 9/2016 | ........... H04W 28/02 |
| WO | 2017022388 A1 | 2/2017 | | |
| WO | 2017030487 A1 | 2/2017 | | |
| WO | WO2017/022388 | * | 2/2017 | ........... H04W 24/08 |
| WO | 2017113562 A1 | 7/2017 | | |
| WO | WO2017211401 | * | 12/2017 | ........... H04W 16/32 |
| WO | WO2018/059866 | * | 4/2018 | ........... H04W 12/04 |
| WO | WO2018126797 | * | 7/2018 | ........... H04W 24/10 |

OTHER PUBLICATIONS

3GPP TS 36.300 V14.2.0 (Mar. 2017), "3rd Generation Partnership Project;Technical Specification Group Radio Access Network; Evolved Universal Terrestrial Radio Access (E-UTRA) and Evolved Universal Terrestrial Radio Access Network (E-UTRAN); Overall description; Stage 2(Release 14)," Mar. 2017, 330 pages.
3GPP TS 36.300 V14.3.0 (Jun. 2017), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)," Jun. 2017, 331 pages.
3GPP TS 36.413 V14.3.0 (Jun. 2017), "3rd Generation Partnership Project; Technical Specification Group Radio Access Network; Evolved Universal Terrestrial Radio Access Network (E-UTRAN); S1 Application Protocol (S1AP) (Release 14)," Jun. 2017, 347 pages.
3GPP TS 36.423 V14.3.0 (Jun. 2017), "3rd Generation Partnership Project; Technical Specification Group Radio Access Network; Evolved Universal Terrestrial Radio Access Network (E-UTRAN); X2 application protocol (X2AP) (Release 14)," Jun. 2017, 242 pages.
3GPP TS 37.340 V0.2.1 (Aug. 2017), "3rd Generation Partnership Project; Technical Specification Group Radio Access Network; Evolved Universal Terrestrial Radio Access (E-UTRA) and NR; Multi-connectivity; Stage 2 (Release 15)," Aug. 2017, 43 pages.
3GPP TS 38.413 V0.2.1 (Aug. 2017), "3rd Generation Partnership Project; Technical Specification Group Radio Access Network; NG Radio Access Network(NG-RAN); NG Application Protocol (NGAP) (Release 15)," Aug. 2018, 81 pages.
3GPP TS 38.423 V0.1 1 (Jun. 2017), "3rd Generation Partnership Project; Technical Specification Group Radio Access Network; NG Radio Access Network(NG-RAN); Xn application protocol (XnAP) (Release 15)," Jun. 2017, 53 pages.
Office Action issued in Chinese Application No. 201910771691.8 dated Apr. 20, 2020, 11 pages.
PCT International Search Report and Written Opinion issued in International Application No. PCT/CN2018/099615 dated Nov. 2, 2018, 11 pages (partial English translation).
S2-172322—Ericsson, "EPC support for NR (Option 3, 3a, 3x) and charging and identification of NR use," SA WG2 Meeting #120, Busan, Korea, Mar. 27-30, 2017, 4 pages.
S2-173910—Nokia, Alcatel-Lucent Shanghai Bell., "Dual connectivity impact on RAT-BASED Charging in LC," SA WG2 Meeting #121, Hang-Zhou, China, May 15-19, 2017, 4 pages.
S2-175081—Vodafone, SK Telecom, AT&T, "Control of Secondary RAT data volume reporting," SA WG2 Meeting #122, SA Hose Del Cabo, Jun. 26-30, 2017, 3 pages.

(56) References Cited

OTHER PUBLICATIONS

3GPP TR 23.729 VO.3.0 (Mar. 2017), "3rd Generation Partnership Project; Technical Specification Group Services and System Aspects; Study on unlicensed spectrum offloading system enhancements" Mar. 2017, (Release 15),28 Pages.
Nokia et al., "Baseline CR to TS 36.413 covering agreements of RAN3 #98," 3GPP TSG-HAN WG3 Meeting #98 R3-175065, Reno, NV, USA, Nov. 27-Dec. 1, 2017, 90 pages.
Qualcomm Incorporated, "Secondary RAT and data volume reporting in option 3 architecture variants," SA WG2 Meeting #119, S2-171925, Dubrovnik, Croatia, Feb. 13-17, 2017, 4 pages.
Extended European Search Report issued in European Application No. 18843649.7 dated Jun. 26, 2020, 10 pages.
Qualcomm Incorporated, "Secondary RAT and data volume reporting for dual connectivity with NR," 3GPP TSG-SA WG2 Meeting #121, S2-173132, Hangzhou, P.R. China, May 15-19, 2017, 16 pages.
Office Action issued in Chinese Application No. 201880052199.9 dated Aug. 27, 2020, 21 pages (with English translation).
Office Action issued in Russian Application No. 2019143655/07(084583) dated Dec. 13, 2021, 10 pages (with English translation).
Qualcomm Incorporated, AT&T, "Proposed Way Forward for FS_USOS keyissues 1 and 4," 3GPP TSG SA WG2 #121, S2-173598, Hangzhou, PR China, May 15-19, 2017, 4 pages.
Office Action issued in Japanese Application No. 2019-570975 dated Feb. 9, 2021, 5 pages (with English translation).

\* cited by examiner

COMMUNICATION METHODS AND COMMUNICATIONS APPARATUSES

CROSS-REFERENCE TO RELATED APPLICATIONS

This application is a continuation of U.S. patent application Ser. No. 16/566,436, filed on Sep. 10, 2019, which is a continuation of International Patent Application No. PCT/CN2018/099615, filed on Aug. 9, 2018, which claims priority to Chinese Patent Application No. 201710687801.3, filed on Aug. 11, 2017. All of aforementioned patent applications are hereby incorporated by reference in their entireties.

TECHNICAL FIELD

This application relates to the field of wireless communications technologies, and in particular, to communication methods and communications apparatuses.

BACKGROUND

To improve a data transmission throughput, dual connectivity supporting different access technologies, for example, multi-RAT dual connectivity (Multi-RAT Dual Connectivity, MR-DC) and long term evolution (long term evolution, LTE)-wireless local area network (wireless local area network, WLAN) interworking (LTE-WLAN interworking, LWI), is introduced.

FIG. 1 is a schematic diagram of a network with dual connectivity. As shown in FIG. 1, a terminal 01 may communicate with both a master node A and a secondary node B. The master node A and the secondary node B are connected to a core network C. Access technologies used for the master node A and the secondary node B may be the same or different. For example, the master node A is an evolved node (evolved universal terrestrial radio access network NodeB, eNB), and the secondary node B is a new radio node (new radio nodeB, gNB); or the master node A is a gNB, and the secondary node B is an eNB; or the master node A is an eNB or a gNB, and the secondary node B is a wireless local area network (wireless local area network, WLAN) device, where the WLAN device may be a WLAN termination (WLAN termination, WT), an access controller (access controller, AC), or an access point (access point, AP). The core network may be a 4G core network EPC, or a 5G core network (5G core, 5GC).

In the network in FIG. 1, a secondary bearer or a secondary split bearer may be established for the terminal 01. The secondary bearer may be referred to as a secondary cell group (Secondary Cell Group, SCG) bearer in MR-DC, and corresponds to an entire bearer that is moved to a WLAN side in LWI. The secondary split bearer may be referred to as a secondary cell group (SCG) split bearer in MR-DC.

For related content of MR-DC, refer to, for example, related content in Section 4 in 3GPP TS 37.340 V0.2.1. For related content of LWI, refer to, for example, related content in Section 22A in 3GPP TS 36.300 V14.2.0.

FIG. 2 is a schematic diagram of a secondary bearer. As shown in FIG. 2, a user plane connection between a core network C and a secondary node B is established for a terminal 01, and a user plane connection is established between the secondary node B and the terminal 01. When there is downlink data, the core network C sends all data of the bearer to the secondary node B, and then the secondary node B sends all the data of the bearer to the terminal 01. When there is uplink data, the terminal 01 sends all data of the bearer to the secondary node B, and then the secondary node B sends all the data of the bearer to the core network C.

FIG. 3 is a schematic diagram of a secondary split bearer. As shown in FIG. 3, a user plane connection between a core network C and a secondary node B is established for a terminal 01, a user plane connection is established between the secondary node B and the terminal 01, and a user plane connection is established between a master node A and the terminal 01. When there is downlink data, the core network C sends all data of the bearer to the secondary node B, the secondary node B sends a part of the data to the master node A, the master node A sends the part of the data to the terminal 01, and the secondary node B sends remaining data to the terminal 01. When there is uplink data, the terminal 01 may send a part of data of the bearer to the master node A, the master node A sends the part of the data to the secondary node B, the terminal 01 sends remaining data of the bearer to the secondary node B, and the secondary node B sends all of the received data of the bearer to the core network C. Optionally, it may be configured that the terminal 01 sends all data of the bearer to the master node A, and the master node A sends all the data of the bearer to the secondary node B; or it may be configured that the terminal 01 sends all data of the bearer to the secondary node B.

For the secondary bearer or the secondary split bearer, how to more precisely count a transmitted data volume of the bearer is a problem that urgently needs to be resolved.

SUMMARY

This application provides a communication method and a communications apparatus, to more precisely calculate a data volume.

According to a first aspect, this application provides a communication method, including:

receiving, by a master node, at least one first message from at least one secondary node, where the first message includes first information, and the first information is used to indicate a data volume of first data of a first bearer that is transmitted via the secondary node that sends the first message; and sending, by the master node, a second message to a core network, where the second message includes second information, and the second information is used to indicate the data volume of the first data of the first bearer that is transmitted via the at least one the secondary node.

Optionally, the first bearer is a secondary bearer, a secondary split bearer, or a master split bearer.

Optionally, the second message further includes a bearer identifier of the first bearer; or the first data is data of a first flow, and the second message further includes an identifier of the first flow; or the first data is data of a first session, and the second message further includes an identifier of the first session.

Optionally, the first message further includes the bearer identifier of the first bearer; or the first data is the data of the first flow, and the first message further includes the identifier of the first flow; or the first data is the data of the first session, and the first message further includes the identifier of the first session.

Optionally, the data volume of the first data is at least one of an uplink data volume and a downlink data volume, or a sum of an uplink data volume and a downlink data volume.

Optionally, the data volume of the first data does not include header overheads of a PDCP layer, an RLC layer, a MAC layer, or an SDAP layer.

Optionally, the first message or the second message further includes timestamps, and the timestamps are used to indicate a start time and an end time for the data volume.

Optionally, the first data is transmitted by using at least one radio access technology, the data volume includes the data volume of the first data transmitted by using each of the at least one radio access technology, and the second message further includes an identifier of the at least one radio access technology.

Optionally, the master node sends a third message to the secondary node, and the third message is used to request the secondary node to send the data volume of the first data of the first bearer that is transmitted via the secondary node.

Optionally, the third message includes the bearer identifier of the first bearer; or the first data is the data of the first flow, and the third message includes the identifier of the first flow; or the first data is the data of the first session, and the third message includes the identifier of the first session.

Optionally, the master node receives the first message in a secondary node handover procedure, a secondary node release procedure, a secondary node configuration modification procedure, or a master node handover procedure.

Optionally, the second message further includes a bearer type of the first bearer.

According to a second aspect, this application provides a communication method, including:

receiving, by a network element in a core network, a second message sent by a master node, where the second message includes second information, and the second information is used to indicate a data volume of first data of a first bearer that is transmitted via at least one secondary node; and obtaining, by the network element in the core network based on a total data volume of the first bearer and the data volume of the first data, a data volume of the first bearer that is transmitted via the master node and the secondary node.

According to a third aspect, this application provides a communication method, including:

obtaining, by a secondary node, a data volume of first data of a first bearer that is transmitted via the secondary node; and sending, by the secondary node, a first message to a master node, where the first message includes first information, and the first information is used to indicate the data volume of the first data of the first bearer that is transmitted via the at least one secondary node.

Optionally, the first bearer is a secondary bearer, a secondary split bearer, or a master split bearer.

Optionally, the first message further includes a bearer identifier of the first bearer; or the first data is data of a first flow, and the first message further includes an identifier of the first flow; or the first data is data of a first session, and the first message further includes an identifier of the first session.

Optionally, the secondary node sends the first message in a secondary node handover procedure, a secondary node release procedure, a secondary node configuration modification procedure, or a master node handover procedure.

According to a fourth aspect, this application provides a communication method, including:

sending, by a master node, first data to a secondary node when establishing a first secondary bearer or a first secondary split bearer; and sending, by the master node, a first message to a core network, where the first message includes first information, and the first information is used to indicate a data volume of the first data.

Optionally, the first message further includes a bearer identifier of the first secondary bearer or the first secondary split bearer.

Optionally, the first data is data of a first flow, and the first message further includes an identifier of the first flow.

Optionally, the first data is data of a first session, and the first message further includes an identifier of the first session.

Optionally, the data volume is at least one of an uplink data volume and a downlink data volume, or a sum of an uplink data volume and a downlink data volume.

Optionally, the data volume does not include header overheads of a PDCP layer, an RLC layer, a MAC layer, or an SDAP layer.

Optionally, the first message further includes a radio access technology of the secondary node.

Optionally, the first message further includes a bearer type of the secondary bearer or the secondary split bearer.

According to a fifth aspect, this application provides a communication method, including:

receiving, by a network element in a core network, a first message sent by a master node, where the first message includes first information, and the first information is used to indicate a data volume of first data sent by the master node to a secondary node when the master node establishes a first secondary bearer or a first secondary split bearer.

According to a sixth aspect, this application provides a communication method, including:

obtaining, by a master node, a data volume of first data of a first secondary split bearer that is transmitted via the master node; and sending, by the master node, a first message to a core network, where the first message includes first information, and the first information is used to indicate the data volume.

Optionally, the first message further includes a bearer identifier of the first secondary split bearer.

Optionally, the first data is data of a first flow, and the first message further includes an identifier of the first flow.

Optionally, the first data is data of a first session, and the first message further includes an identifier of the first session.

Optionally, the data volume of the first data is at least one of an uplink data volume and a downlink data volume, or a sum of an uplink data volume and a downlink data volume.

Optionally, the data volume of the first data does not include header overheads of a PDCP layer, an RLC layer, a MAC layer, or an SDAP layer.

Optionally, the first message further includes timestamps, and the timestamps are used to indicate a start time and an end time for the data volume of the first data.

Optionally, the first message further includes a bearer type of the first secondary split bearer.

Optionally, if the master node sends migrated data to the secondary node when establishing the first secondary split bearer, the master node sends second information to the core network, and the second information is used to indicate a data volume of the migrated data.

According to a seventh aspect, this application provides a communication method, including:

receiving, by a network element in a core network, a first message sent by a master node, where the first message includes first information, and the first information is used to indicate a data volume of first data of a first secondary split bearer that is transmitted via the master node; and calculating, by the network element in the core network based on a total data volume of the first secondary split bearer and the data volume of the first data, a data volume of the first secondary split bearer that is transmitted via the master node and a secondary node.

According to an eighth aspect, this application provides a communications apparatus, including a memory and a processor. The memory is configured to store a computer program, and the processor is configured to invoke the computer program from the memory and run the computer program, so that the communications apparatus performs the method according to the first aspect, the fourth aspect, or the sixth aspect.

According to a ninth aspect, this application provides a communications apparatus, including a memory and a processor. The memory is configured to store a computer program, and the processor is configured to invoke the computer program from the memory and run the computer program, so that the communications apparatus performs the method according to the second aspect, the fifth aspect, or the seventh aspect.

According to a tenth aspect, this application provides a network element in a core network, including a memory and a processor. The memory is configured to store a computer program, and the processor is configured to invoke the computer program from the memory and run the computer program, so that the communications apparatus performs the method according to the third aspect.

According to an eleventh aspect, an embodiment of this application provides a computer storage medium, configured to store computer software instructions used by the communications apparatus according to the eighth aspect, and the computer software instructions includes a program designed for performing the methods according to the first aspect to the tenth aspect.

According to a twelfth aspect, this application further provides a computer program product including instructions. The computer program product includes computer-executable instructions, and when the instructions are run on a computer, the computer is enabled to perform the methods according to the first aspect to the tenth aspect.

According to a thirteenth aspect, this application further provides a chip system. The chip system includes a processor, configured to support a terminal device in implementing functions in the first aspect to the tenth aspect. In a possible design, the chip system further includes a memory, and the memory is configured to store program instructions and data that are necessary to a communications apparatus, for example, store the data or the information in the methods according to the first aspect to the tenth aspect. The chip system may include a chip, or may include a chip and another discrete device.

BRIEF DESCRIPTION OF DRAWINGS

To describe the technical solutions in this application more clearly, the following briefly describes the accompanying drawings required for describing the embodiments. Apparently, the accompanying drawings in the following description show merely some embodiments of the present invention, and a person of ordinary skill in the art may derive other drawings from these accompanying drawings without creative efforts.

DESCRIPTION OF EMBODIMENTS

The following describes technical solutions of this application with reference to accompanying drawings in this application.

Figure 1:
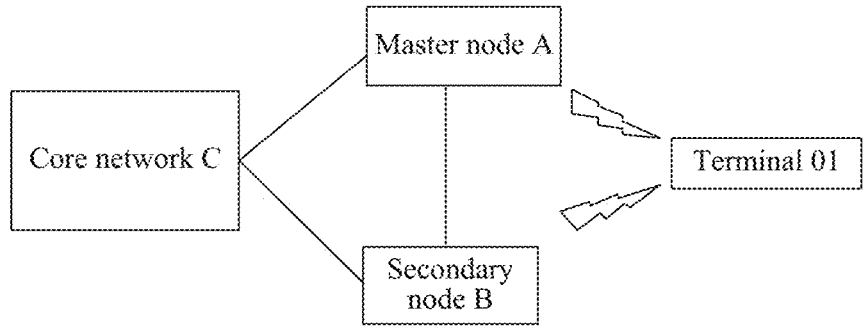
FIG. 1 is a schematic diagram of a network with dual connectivity according to this application.
Figure 2:
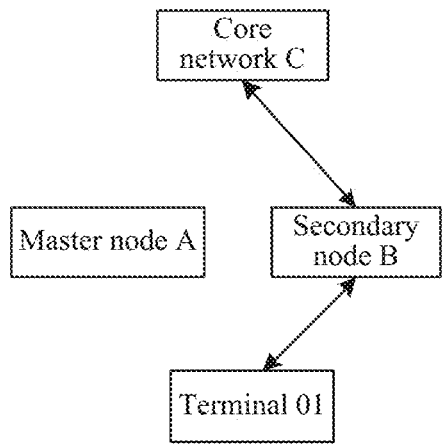
FIG. 2 is a schematic diagram of a secondary bearer according to this application.
Figure 3:
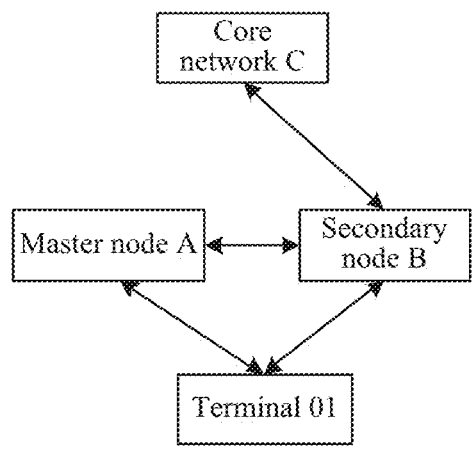
FIG. 3 is a schematic diagram of a secondary split bearer according to this application.

In a network shown in FIG. 1, in a scenario of a secondary bearer, a core network C may learn of a data volume transmitted between the core network C and a secondary node B after the secondary bearer is established, but does not know whether a master node A transfers data to the secondary node B for transmission in a process of establishing the secondary bearer, and consequently, a data volume transmitted via the secondary node B that is learned of by the core network C is inaccurate. In addition, in a scenario of a secondary split bearer, the core network C may learn of a total data volume of the secondary split bearer, but cannot learn of a data volume transmitted via each of the master node A and the secondary node B.

To more precisely count a data volume of a secondary bearer or a secondary split bearer, the embodiments of this application provide the following three solutions.

Solution 1: In a scenario of a secondary split bearer, a master node A reports a data volume of the bearer that is split to the master node A. According to the solution, a core network may learn of, by using the data volume of the bearer that is split to the master node A, a data volume of the bearer that is transmitted via a secondary node B, so that the core network may separately learn of data volumes of the bearer that are transmitted via different nodes, thereby more precisely counting the data volume.

Solution 2: In a scenario of a secondary bearer or a secondary split bearer, a master node A reports, to a core network C, a data volume sent by the master node A to a secondary node B in a process of establishing the secondary bearer or the secondary split bearer. According to the solution, the core network C may correct a data volume of the bearer that is transmitted via the secondary node B, to correctly obtain the data volume of the bearer that is transmitted via the secondary node, thereby precisely counting the data volume.

Solution 3: In a scenario of a secondary bearer or a secondary split bearer, a secondary node B sends, to a master node A, a data volume of the bearer that is transmitted via the secondary node B, and the master node A sends the data volume to a core network. According to the solution, the core network may learn of, by using the data volume of the bearer that is transmitted via the secondary node B, a data volume of the bearer that is transmitted via the master node A, thereby precisely counting the data volume.

In addition, in the foregoing solutions 1 to 3, when access technologies of the master node A and the secondary node B are different, data volumes of the bearer that are transmitted by using different access technologies can be learned of, thereby more precisely counting the data volume.

Solution 1

Solution 1 is described below with reference to different examples.

Example 1

Figure 4:
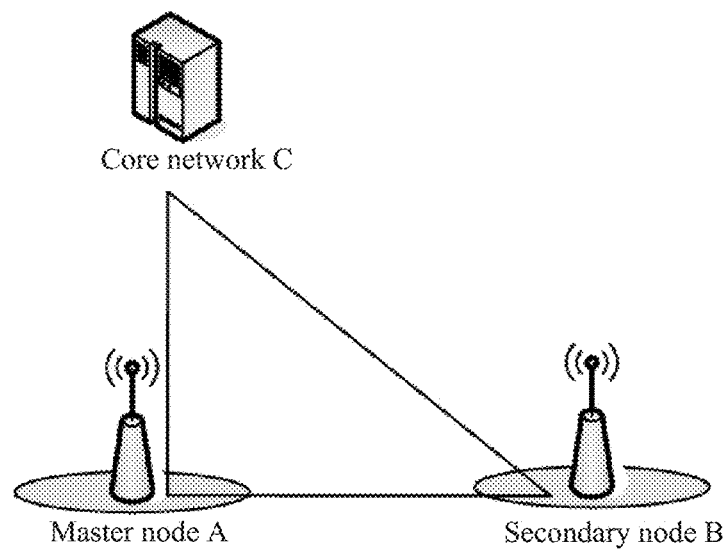
FIG. 4 is a schematic diagram of an application scenario of dual connectivity according to this application.

FIG. 4 shows an application scenario of the network shown in FIG. 1. In FIG. 4, the master node A is an eNB 01, the secondary node B is a gNB 01, and the core network C is an EPC or a 5GC. The network establishes an SCG split bearer for the terminal 01.

It should be noted that in this embodiment of this application, the 5GC supports a session (session) and a flow (flow), to be specific, the 5GC can identify a flow or a session to which data belongs, and the session may include one or more flows. The EPC supports a bearer, to be specific, the EPC can identify a bearer to which data belongs. With development of technologies, the 5GC is likely to further support a bearer, and the EPC is likely to further support a flow and a session. This is not limited in this application.

Figure 5:
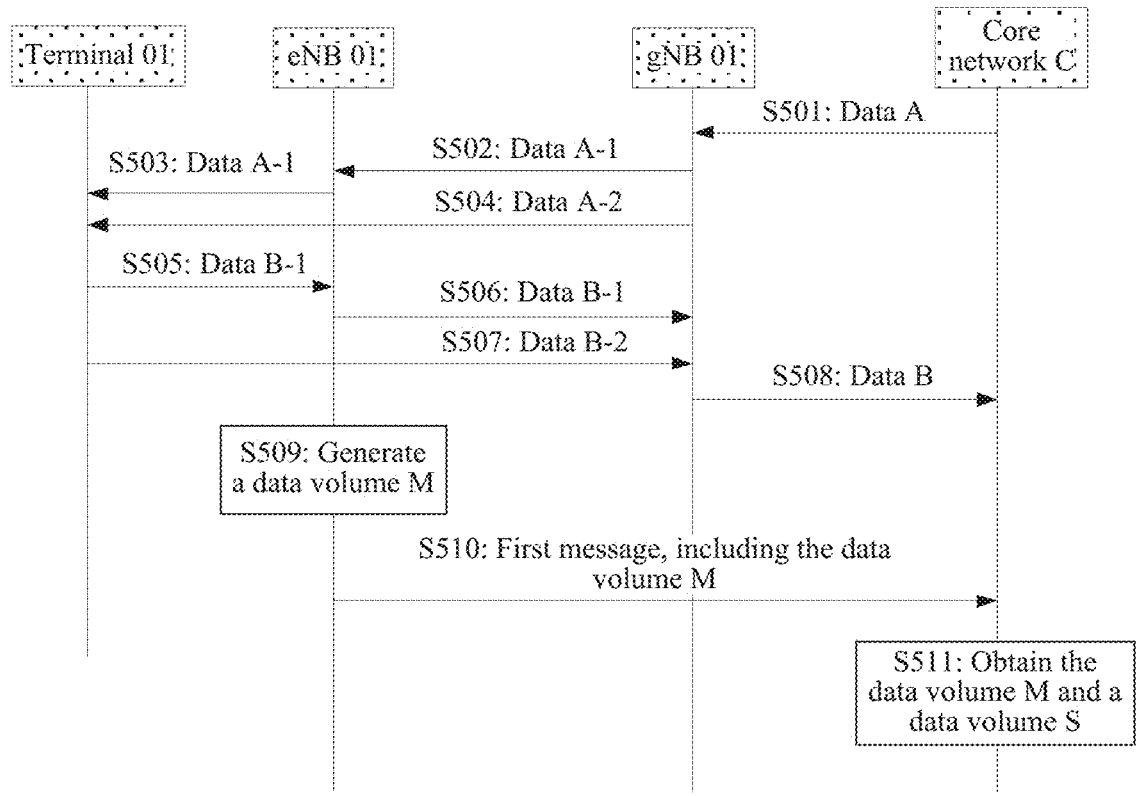
FIG. 5 is a flowchart of a method for calculating a data volume in an SCG split bearer according to this application.

As shown in FIG. 5:

S501 to S504 show a transmission process of downlink data of an SCG split bearer in a scenario of the SCG split bearer. In the transmission process of the downlink data, the core network C needs to send data A of the SCG split bearer to the terminal 01, and the gNB 01 may split a part of the data A, for example, data A-1, to the eNB 01 for sending to the terminal 01.

S501: The core network C sends the data A of the SCG split bearer to the gNB 01.

S502: The gNB 01 sends data A-1, namely, a part of data A, to the eNB 01.

S503: The eNB 01 sends the data A-1 to the terminal 01.

S504: The gNB 01 sends data A-2, namely, the other part of the data A, to the terminal 01.

S505 to S508 show a transmission process of uplink data of an SCG split bearer in a scenario of the SCG split bearer. In the transmission process of the uplink data, the terminal 01 needs to send data B of the SCG split bearer to the core network C, and the terminal 01 may split a part of the data B, for example, data B-1, to the eNB 01 for sending to the gNB 01.

S505: The terminal 01 sends data B-1, namely, a part of the data B, to the eNB 01.

S506: The eNB 01 sends the data B-1 to the gNB 01.

S507: The terminal 01 sends data B-2, namely, the other part of the data B, to the gNB 01.

S508: The gNB 01 sends the data B to an EPC 01.

According to S509 to S511, the EPC 01 may separately obtain a data volume of data of the SCG split bearer that is transmitted via the eNB 01 and a data volume of data of the SCG split bearer that is transmitted via the gNB 01.

S509: The eNB 01 counts the data volume (which is expressed as a data volume M below) of the data of the SCG split bearer that is transmitted via the eNB 01.

The data volume of the data of the SCG split bearer that is transmitted via the gNB 01 is expressed as a data volume S below.

Optionally, the data volume may be reported based on an uplink/downlink granularity. The data volume M is at least one data volume of a data volume of the data A-1 and a data volume of the data B-1. Optionally, the data volume M may be a sum of a data volume of the data A-1 and a data volume of the data B-1.

It should be noted that the data volume may be counted in real time, periodically, or as triggered by an event (for example, the network initiates some particular procedures). This is not limited in this embodiment of this application.

S510: The eNB 01 sends a first message to the core network C, where the first message includes first information, and the first information is used to indicate the data volume M.

To help the core network C learn of a bearer, a session, or a flow to which the data volume M reported by the eNB 01 corresponds, when reporting the data volume M to the core network C, the eNB 01 may include, according to a network requirement, a bearer identifier, a session identifier, or a flow identifier corresponding to the data volume M. For example, the first information may further include the bearer identifier, the session identifier, or the flow identifier corresponding to the data volume M. Specifically, reporting the data volume corresponding to the bearer, the session, or the flow may be indicated by the core network C to the eNB 01.

S511: The core network C separately obtains the data volume M and the data volume S.

Optionally, the data volume S may be at least one data volume of a data volume of the data A-2 and the data volume of the data B-1. Optionally, the data volume M may be a sum of a data volume of the data A-2 and a data volume of the data B-2.

The core network C may learn of a data volume of the data A. Therefore, the core network C may obtain the data volume of the data A-2 based on the data volume of the data A and the data volume of the data A-1. The data volume of the data A-2 is equal to the data volume of the data. A minus the data volume of the data A-1.

The core network C may learn of a data volume of the data B. Therefore, the core network C may obtain the data volume of the data B-2 based on the data volume of the data B and the data volume of the data B-1. The data volume of the data B-2 is equal to the data volume of the data B minus the data volume of the data B-1.

The core network C may learn of a sum of the data volume of the data A and the data volume of the data B. Therefore, the core network C may obtain the sum of the data volume of the data A-2 and the data volume of the data B-2 based on the sum of the data volume of the data A and the data volume of the data B and the sum of the data volume of the data A-1 and the data volume of the data B-1. The sum of the data volume of the data A-2 and the data volume of the data B-2 is equal to the sum of the data volume of the data A and the data volume of the data B minus the sum of the data volume of the data A-1 and the data volume of the data B-1.

For an occasion on which the eNB 01 reports the data volume to the core network C (for example, S510), there are the following optional implementations.

In a first optional implementation, the eNB 01 may periodically send the first message to the core network C. The period may be determined by the gNB 01 or the eNB 01, or the core network C sends the period to the eNB 01. Optionally, the data volume M reported via the first message may be a data volume of the SCG split bearer that is transmitted via the eNB 01 within a current period or an accumulated data volume of the SCG split bearer that is transmitted via the eNB 01 after the SCG split bearer is established.

In a second optional implementation, the eNB 01 may send the first message to the core network C after receiving a request from the core network C to report the data volume of the SCG split bearer. Optionally, the data volume M reported via the first message may be a data volume of the SCG split bearer that is transmitted via the eNB 01 in duration between a previous request of the core network C and the current request or an accumulated data volume of the SCG split bearer that is transmitted via the eNB 01 after the SCG split bearer is established.

In a third optional implementation, when an interface between the eNB 01 and the core network C is released, or when a connection between the eNB 01 and the core network C is suspended, or in a bearer deactivation procedure of the eNB 01, the eNB 01 may report the data volume M via the first message. For example, if the core network is a 5GC, when an NG interface between the eNB 01 and the core network C is released or in a PDU session resource release procedure, the eNB 01 may report the data volume M via the first message. Optionally, the first message may be an existing message in the foregoing procedure, or may be a newly added message.

It should be noted that one or more of the foregoing three implementations may all be deployed in the network.

Optionally, the first message may further include a bearer type of the bearer corresponding to the data volume M (for example, a bearer type of the SCG split bearer is an SCG split bearer).

In an optional design, to help the core network C count the data volume, the first message in S510 further includes timestamps, and the timestamps are used to indicate a start time and an end time, generated by the eNB 01, of the data volume that is transmitted via the eNB 01 in S509.

In this example and the following examples, the core network (for example, a network element serving gateway (serving gateway, SGW) or a packet data network gateway (packet data network gateway, PGW) of the core network) can count the data volume in more dimensions (for example, based on a bearer granularity, based on a time granularity, or based on a radio access technology granularity) by using the bearer identifier, the timestamps, and a radio access technology of the secondary node that correspond to the reported data volume, thereby more precisely counting the data volume. Further, the core network can implement multidimensional charging based on the multidimensional data volume counting.

In an optional design, the counting of the data volume in S509 may exclude data header overheads, for example, header overheads of a protocol layer such as a packet data convergence protocol (packet data convergence protocol, PDCP) layer, a radio link control (radio link control, RLC) layer, a media access control (media access control, MAC) layer, or a service data adaptation protocol (service data adaptation protocol, SDAP) layer. According to the design, a data volume of an actual service can be precisely calculated, and user experience is better.

In an optional design, the process may further include a step of sending, by the eNB 01 to the core network C in a process of establishing the SCG split bearer, the data volume of the data sent to the gNB 01. For details, refer to content in the following solution 2. According to the design, the core network C may correct the data volume of the data of the SCG split bearer that is transmitted via the secondary node, thereby more precisely counting the data volume.

In an optional design, to more precisely count the data volume, the data volume may be counted based on a session or flow granularity. The master node and the secondary node may learn of a flow (flow) or a session (session) to which data belongs. For example, the session may also be referred to as a packet data unit (packet data unit, PDU) session. One session may include one or more flows. For example, the data A and the data B are data of a session A. The session A includes a flow 1 and a flow 2. The data A-1 may include a part of data of the flow 1 (which is referred to as data A-1-f1 for short) and a part of data of the flow 2 (which is referred to as data A-1-f2 for short). The data A-2 may include a part of data of the flow 1 (which is referred to as data A-2-f1 for short) and a part of data of the flow 2 (which is referred to as data A-2-f2 for short). The data B-1 may include a part of data of the flow 1 (which is referred to as data B-1-f1 for short) and a part of data of the flow 2 (which is referred to as data B-1-f2 for short). The data B-2 may include a part of data of the flow 1 (which is referred to as data B-2-f1 for short) and a part of data of the flow 2 (which is referred to as data B-2-f2 for short).

Optionally, according to a network requirement, in S509, the eNB 01 may count the data volume at a flow granularity or a session granularity. For example, at least one of an uplink data volume and a downlink data volume of the flow 1 carried by the SCG split bearer that are transmitted via the eNB 01 or a sum of uplink and downlink data volumes is counted; or at least one of an uplink data volume and a downlink data volume of the session A carried by the SCG split bearer that are transmitted via the eNB 01 or a sum of uplink and downlink data volumes is counted.

Optionally, according to a network requirement, in S510, the data volume M reported by the eNB 01 may be a data volume at the flow granularity or a data volume at the session granularity. When reporting the data volume M, the eNB 01 may further report at least one (which, for example, is carried in the first message in S510) of the flow identifier and the session identifier corresponding to the data volume M. For example, the data volume M is the downlink data volume of the flow 1 (for example, a data volume of the data A-1-f1), so that a flow identifier of the flow 1 is reported, and optionally, a session identifier of the session A corresponding to the flow 1 may be further reported; the data volume M is an uplink data volume of the flow 2 (for example, a data volume of the data B-1-f2, so that a flow identifier of the flow 2 may be reported, and optionally, the session identifier of the session A corresponding to the flow 2 may be further reported); the data volume M is a downlink data volume of the session A (for example, the data volume of the data A-1, so that the session identifier of the session A is reported); and the data volume M is an uplink data volume of the session A (for example, the data volume of the data B-1, so that the session identifier of the session A is reported).

In the SCG split bearer, the data volume of the SCG split bearer that is transmitted via the eNB 01 is reported by the eNB 01, so that the core network C can calculate, based on a total data volume of the SCG split bearer and the data volume of the SCG split bearer that is transmitted via the eNB 01, the data volume of the SCG split bearer that is transmitted via the gNB 01, so that the core network C may separately learn of the data volume of the data of the SCG split bearer that is transmitted via the eNB 01 and the data volume of the data of the SCG split bearer that is transmitted via the gNB 01. In addition, radio access technologies of the eNB 01 and the gNB 01 are different. Therefore, the core network C can separately learn of data volumes of the SCG split bearer that are transmitted by using the different radio access technologies, thereby implementing precise data volume calculation.

It should be noted that Solution 1 is also applicable to another application scenario of the secondary split bearer. For example, the master node A is a gNB, the secondary node B is an eNB, and the core network C is an EPC or a 5GC; or the master node A is an eNB, the secondary node B is a WT, and the core network C is an EPC or a 5GC; or the master node A is a gNB, the secondary node B is a WT, and the core network C is an EPC or a 5GC. This is not limited in this embodiment of this application.

The method provided in Solution 1 is described below separately from a perspective of a master node side and a perspective of a core network side.

The following is the method of Solution 1 that is described from the perspective of the master node side. The method M1 includes the following steps.

M101: The master node obtains information about a data volume of data of a secondary split bearer that is transmitted via the master node.

For related descriptions of M101, refer to related content of S509.

M102: The master node sends a first message to the core network, where the first message includes first information, and the first information is used to indicate the information about the data volume of the data of the secondary split bearer that is transmitted via the master node.

For related descriptions of M102, refer to related content of S510.

Optionally, the method M1 further includes M103: The master node sends second information to the core network, where the second information is used to indicate a data volume of data sent by the master node to the secondary node in a process of establishing the secondary split bearer. According to M103, the core network may correct a data volume of data of the secondary split bearer, thereby more precisely counting the data volume.

The following is the method of Solution 1 that is described from the perspective of the core network side. The method M2 includes the following steps.

M201: A network element in the core network receives a first message from the master node, where the first message includes first information, and the first information is used to indicate a data volume of data of the secondary split bearer that is transmitted via the master node.

For related content of M201, refer to related content of S509.

M202: The network element in the core network obtains, based on a data volume of data of the secondary split bearer and the data volume of the data of the secondary split bearer that is transmitted via the master node, information about a data volume of data of the secondary split bearer that is transmitted via the secondary node.

For related descriptions of M202, refer to related content of S510.

Optionally, the method M2 further includes: receiving, by the network element in the core network, second information from the master node, where the second information is used to indicate a data volume of data sent by the master node to the secondary node in a process of establishing the secondary split bearer. According to M103, the network element in the core network element may correct a data volume of data of the secondary split bearer, thereby more precisely counting the data volume.

For optional designs and implementations related to the method M1 and the method M2, refer to related content of the foregoing Example 1. This is not limited herein.

According to Solution 1, the core network may separately learn of the data volume of the data of the secondary split bearer that is transmitted via the master node and the data volume of the data of the secondary split bearer that is transmitted via the secondary node, thereby more precisely counting the data volume.

Solution 2

Solution 2 is described below with reference to different examples.

Example 2

The master node A is an eNB 01, the core network is an EPC or a 5GC, and the terminal 01 communicates with the eNB 01. The eNB 01 selects a gNB 01 as the secondary node B, and establishes an SCG bearer or an SCG split bearer.

Figure 6:
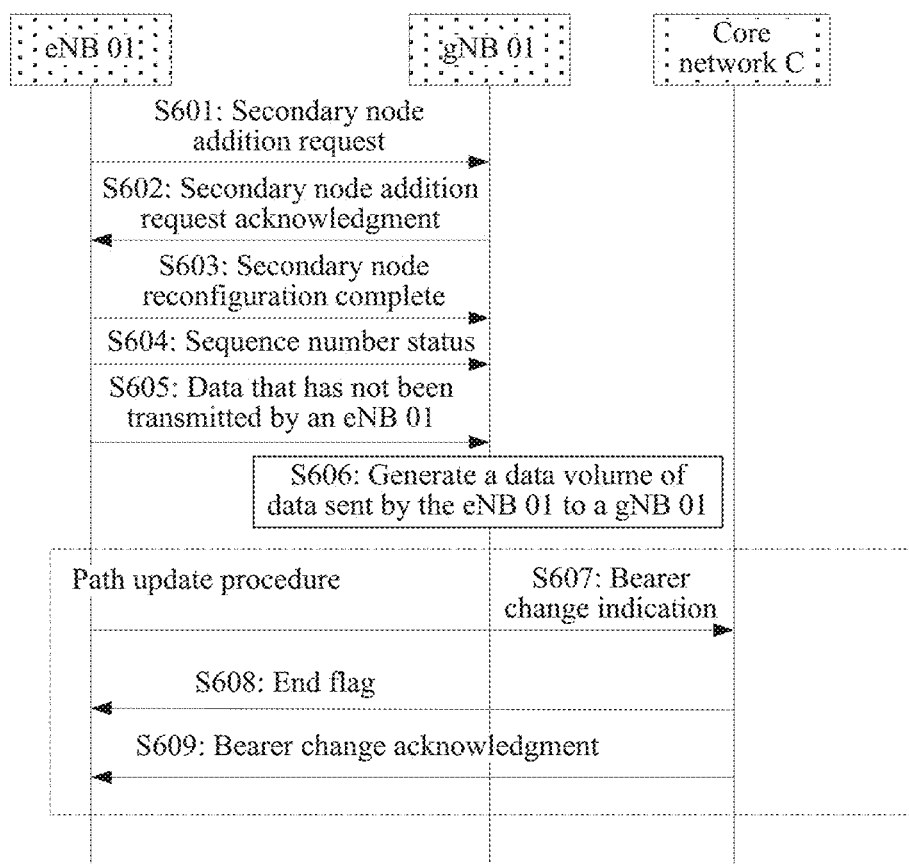
FIG. 6 is a flowchart of a method for calculating a data volume when an SCG split bearer or an SCG bearer is established according to this application.

As shown in FIG. 6:

S601 to S603 show some signaling interaction processes for adding a secondary node. It should be noted that the processes or message names in the processes may vary with development of technologies or for different networks. This is not limited in this embodiment of this application.

S601: The eNB 01 sends a secondary node addition request message to the gNB 01.

S602: The gNB 01 sends a secondary node addition request acknowledgment message to the eNB 01.

S603: The eNB 01 sends a secondary node reconfiguration complete message to the gNB 01.

S604 to S605 show a process of migrating data by the master node to the secondary node, so that the secondary node transmits the data.

S604: The eNB 01 sends a sequence number (sequence number, SN) status to the gNB 01.

S605: The eNB 01 sends, to the gNB 01, data that has not been transmitted via the eNB 01.

The data that has not been transmitted may be at least one of the following: downlink data that is to be sent by the eNB 01 to the terminal 01, and uplink data that is to be sent by the eNB 01 to the core network C and that is of the terminal 01.

Figure 10:
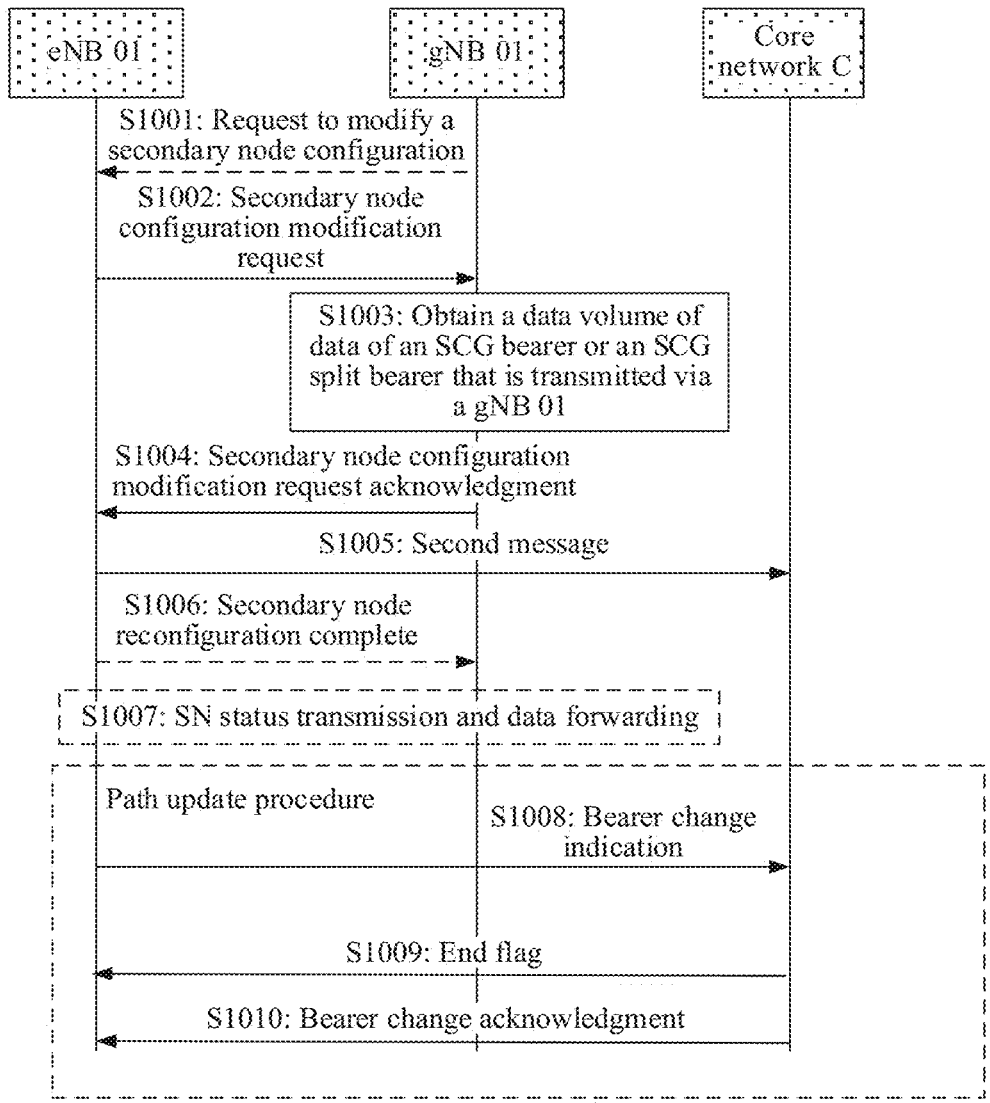
FIG. 10 is a flowchart of a method for calculating a data volume in an SCG split bearer or an SCG bearer according to this application.

For S601 to S605, separately refer to, for example, related content of steps 1, 2, 5, 7, and 8 in FIG. 10.2.1-1 in Section 10.2.1 in 3GPP TS 37.340 V0.2.1.

S606: The eNB 01 obtains a data volume of the data (which is referred to as migrated data for short below) sent by the eNB 01 to the gNB 01.

In an optional design, the counting of the data volume may exclude migrated data header overheads, for example, header overheads of a protocol layer such as a PDCP layer, an RLC layer, a MAC layer, or an SDAP layer. According to the design, a data volume of an actual service can be precisely calculated, and user experience is better.

S607: The eNB 01 sends a bearer change indication message to the core network C, where the bearer change indication message includes first information, and the first information is used to indicate the data volume of the migrated data.

Optionally, the eNB 01 may alternatively add the first information to another message. For ease of description, in this example, a message carrying the first information is referred to as a first message.

Optionally, the data volume of the migrated data may be counted or reported based on a bearer granularity, a session granularity, or a flow granularity. In an example, the first message further includes one or more of a bearer identifier (namely, an identifier of the SCG bearer or the SCG split bearer), a session identifier, and a flow identifier that correspond to the migrated data. Specifically, a granularity of the data volume reported to the core network C may be indicated by the core network C to the master node. For detailed descriptions of the foregoing related content, refer to related content of Example 1.

Optionally, the data volume of the migrated data may be counted or reported based on an uplink/downlink granularity. For detailed descriptions of related content, refer to related content of Example 1.

Optionally, the first message may further include a radio access technology of the secondary node. For related content, refer to related content of Example 1.

Optionally, the first message may further include a bearer type of the SCG bearer or the SCG split bearer. For related content, refer to related content of Example 1.

Optionally, the first information may be alternatively sent by the master node to the core network via a newly added message.

According to S607, the core network C can learn of the data volume migrated by the master node to the secondary node in a process of establishing the SCG bearer or the SCG split bearer, so that the core network C can correctly learn of a data volume of data of the SCG bearer or the SCG split bearer that is transmitted via the secondary node, thereby more precisely counting the data volume.

To reflect integrity of the procedure, the other part of path updating is shown below.

S608: The core network C sends an end flag to the eNB 01.

S609: An EPC 01 sends a bearer change acknowledgment message to the eNB 01.

For S608 and S609, refer to, for example, related content of steps 11 and 12 in FIG. 10.2.1-1 in Section 10.2.1 in 3GPP TS 37.340 V0.2.1.

Optional designs and implementations related to Example 2 in Example 1 are also applicable to Example 2, and details are not described herein again.

It should be noted that Example 2 is also applicable to another application scenario of the secondary bearer or the secondary split bearer. For example, the master node A is a gNB, the secondary node B is an eNB, and the core network C is an EPC or a 5GC; or the master node A is an eNB, the secondary node B is a WT, and the core network C is an EPC or a 5GC; or the master node A is a gNB, the secondary node B is a WT, and the core network C is an EPC or a 5GC. This is not limited in this embodiment of this application.

Example 3

The master node A is an eNB 01, the secondary node B is a gNB 01, and the core network C is an EPC or a 5GC. Example 3 mainly relates to establishing an SCG split bearer or an SCG bearer through secondary node configuration modification.

Figure 7:
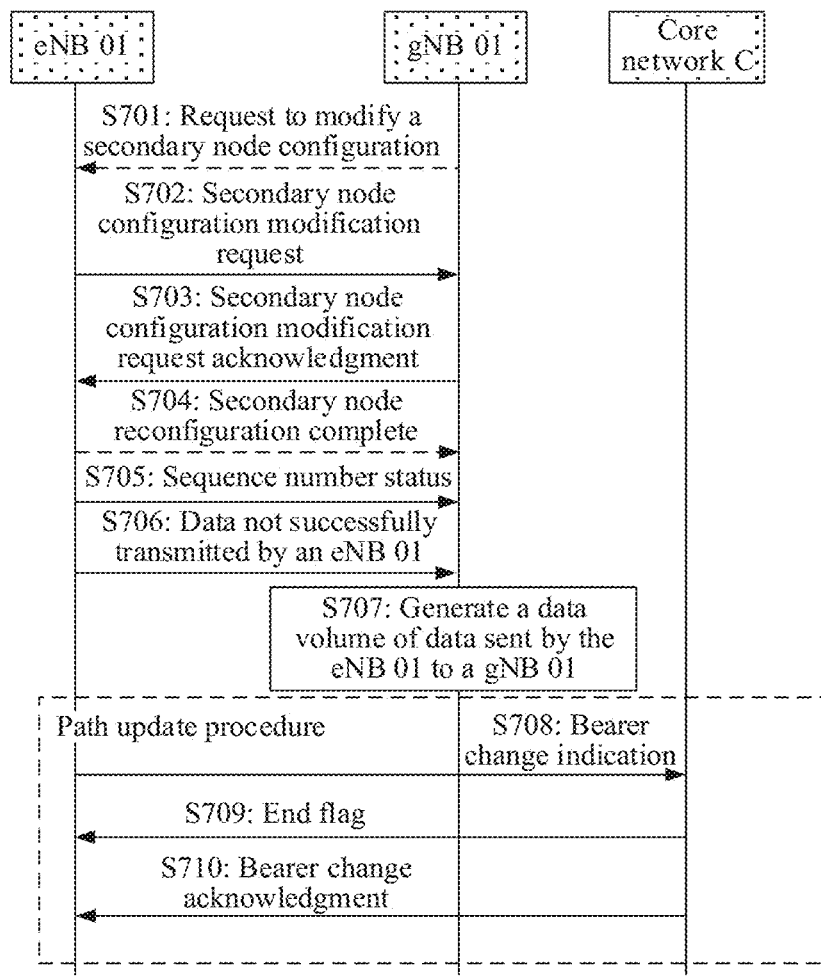
FIG. 7 is a flowchart of another method for calculating a data volume when an SCG split bearer or an SCG bearer is established according to this application.

As shown in FIG. 7:

S701 to S704 show some signaling interaction processes for the secondary node configuration modification. It should be noted that the processes or message names in the processes may vary with development of technologies or for different networks. This is not limited in this embodiment of this application.

S701: The gNB 01 sends, to the eNB 01, a message for requesting to modify a secondary node configuration.

S701 is optional, and the gNB 01 may actively initiate a gNB 01 configuration modification procedure.

S702: The eNB 01 sends a secondary node configuration modification request message to the gNB 01.

S703: The gNB 01 sends a secondary node configuration modification request acknowledgment message to the eNB 01.

S704: The eNB 01 sends a secondary node reconfiguration complete message to the gNB 01.

S705 and S706 show a process of migrating data by the master node to the secondary node, so that the secondary node transmits the migrated data (which is referred to as migrated data for short below).

S705: The eNB 01 sends a sequence number (sequence number, SN) status to the gNB 01.

S706: The eNB 01 sends, to the gNB 01, data that has not been transmitted via the eNB 01.

The data that has not been transmitted may be at least one of the following: downlink data that is to be sent by the eNB 01 to the terminal 01 and uplink data that is to be sent by the eNB 01 to the core network C.

For S701 to S706, separately refer to, for example, related content of steps 1, 2, 3, 6, 8, and 9 in FIG. 10.3.1-2 in Section 10.3.1 in 3GPP TS 37.340 V0.2.1.

S707: The eNB 01 obtains a data volume of the data sent by the eNB 01 to the gNB 01.

In an optional design, the counting of the data volume may exclude migrated data header overheads, for example, header overheads of a protocol layer such as a PDCP layer, an RLC layer, a MAC layer, or an SDAP layer. According to the design, a data volume of an actual service can be precisely calculated, and user experience is better.

S708: The eNB 01 sends a bearer change indication message to the core network C, where the bearer change indication message includes first information, and the first information is used to indicate the data volume of the migrated data.

Optionally, the eNB 01 may alternatively add the first information to another message. For ease of description, in this example, a message carrying the first information is referred to as a first message.

Optionally, the data volume of the migrated data may be counted or reported based on a bearer granularity, a session granularity, or a flow granularity. In an example, the first message further includes one or more of a bearer identifier (namely, an identifier of the SCG bearer or the SCG split bearer), a session identifier, and a flow identifier that correspond to the migrated data. Specifically, a granularity of the data volume reported to the core network C may be indicated by the core network C to the master node. For detailed descriptions of the foregoing related content, refer to related content of Example 1 and Example 2.

Optionally, the data volume of the migrated data may be counted or reported based on an uplinkL downlink granularity. For detailed descriptions of related content, refer to related content of Example 1 and Example 2.

Optionally, the first message may further include a radio access technology of the secondary node. For related content, refer to related content of Example 1 and Example 2.

Optionally, the first message may further include a bearer type of the SCG bearer or the SCG split bearer. For related content, refer to related content of Example 1 and Example 2.

Optionally, the first information may be alternatively sent by the master node to the core network via a newly added message.

According to S708, the core network C can learn of the data volume migrated by the master node to the secondary node in a process of establishing the SCG bearer or the SCG split bearer, so that the core network C can correctly learn of a data volume of data of the SCG bearer or the SCG split bearer that is transmitted via the secondary node, thereby more precisely counting the data volume. To reflect integrity of the procedure, the other part of path updating is shown below.

S709: The core network C sends an end flag to the eNB 01.

S710: An EPC 01 sends a bearer change acknowledgment message to the eNB 01.

For S709 and S710, separately refer to, for example, related content of steps 11 and 12 in FIG. 10.2.1-1 in Section 10.2.1 in 3GPP TS 37.340 V0.2.1.

Optional designs related to Example 3 in Example 1 and Example 2 are also applicable to Example 3, and details are not described herein again.

It should be noted that Example 3 is also applicable to another application scenario of the secondary bearer or the secondary split bearer. For example, the master node A is a gNB, the secondary node B is an eNB, and the core network C is an EPC or a 5GC; or the master node A is an eNB, the secondary node B is a WT, and the core network C is an EPC or a 5GC; or the master node A is a gNB, the secondary node B is a WT, and the core network C is an EPC or a 5GC. This is not limited in this embodiment of this application.

The method provided in Solution 2 is described below separately from a perspective of a master node side and a perspective of a core network side.

The following is the method of Solution 2 that is described from the perspective of the master node side. The method M3 includes the following steps.

M301: When establishing the secondary bearer or the secondary split bearer, the master node sends migrated data to the secondary node.

For related descriptions of M301, refer to related content of S605 and S706.

M302: The master node sends a first message to the core network, where the first message includes first information, and the first information is used to indicate a data volume of the migrated data.

For related descriptions of M302, refer to related content of S607 and S708.

The following is the method of Solution 2 that is described from the perspective of the core network side. The method M4 includes the following steps.

M401: When establishing the secondary bearer or the secondary split bearer, a network element in a core network receives a first message from the master node, where the first message includes first information, and the first information is used to indicate a data volume of migrated data sent by the master node to the secondary node when the secondary bearer or the secondary split bearer is established.

For related descriptions of M401, refer to related content of S607 and S708.

M402: The network element in the core network obtains, based on the data volume of the migrated data, a data volume of data of the secondary bearer or the secondary split bearer that is transmitted via the secondary node.

For related descriptions of M402, refer to related content of S607 and S708.

For optional designs and implementations related to the method M3 and the method M4, refer to content of the foregoing Example 2 and Example 3. Details are not described herein again.

According to Solution 2, the core network may correct the data volume of the data of the secondary bearer or the secondary split bearer that is transmitted via the secondary node, thereby more precisely counting the data volume.

Solution 3

Solution 3 is described below with reference to different examples.

Example 4

The master node A is an eNB 01, the secondary node B is a gNB 01, the core network C is an EPC or a 5GC, and the network establishes an SCG bearer or an SCG split bearer for the terminal 01. The master node A remains unchanged, and the secondary node B is handed over from the gNB 01 (a source gNB) to a gNB 02 (a target gNB). For uplink data and downlink data transmission processes of the SCG split bearer before the handover, refer to related descriptions of S501 to S508 in FIG. 5.

It should be noted that in this embodiment of this application, the 5GC supports a session (session) and a flow (flow), to be specific, the 5GC can identify a flow or a session to which data belongs, and the session may include one or more flows. The EPC supports a bearer, to be specific, the EPC can identify a bearer to which data belongs. With development of technologies, the 5GC is likely to further support a bearer, and the EPC is likely to further support a flow and a session. This is not limited in this application. The following examples show some signaling interaction processes. It should be noted that the processes or message names in the processes may vary with development of technologies or for different networks. This is not limited in this embodiment of this application.

Figure 8A:
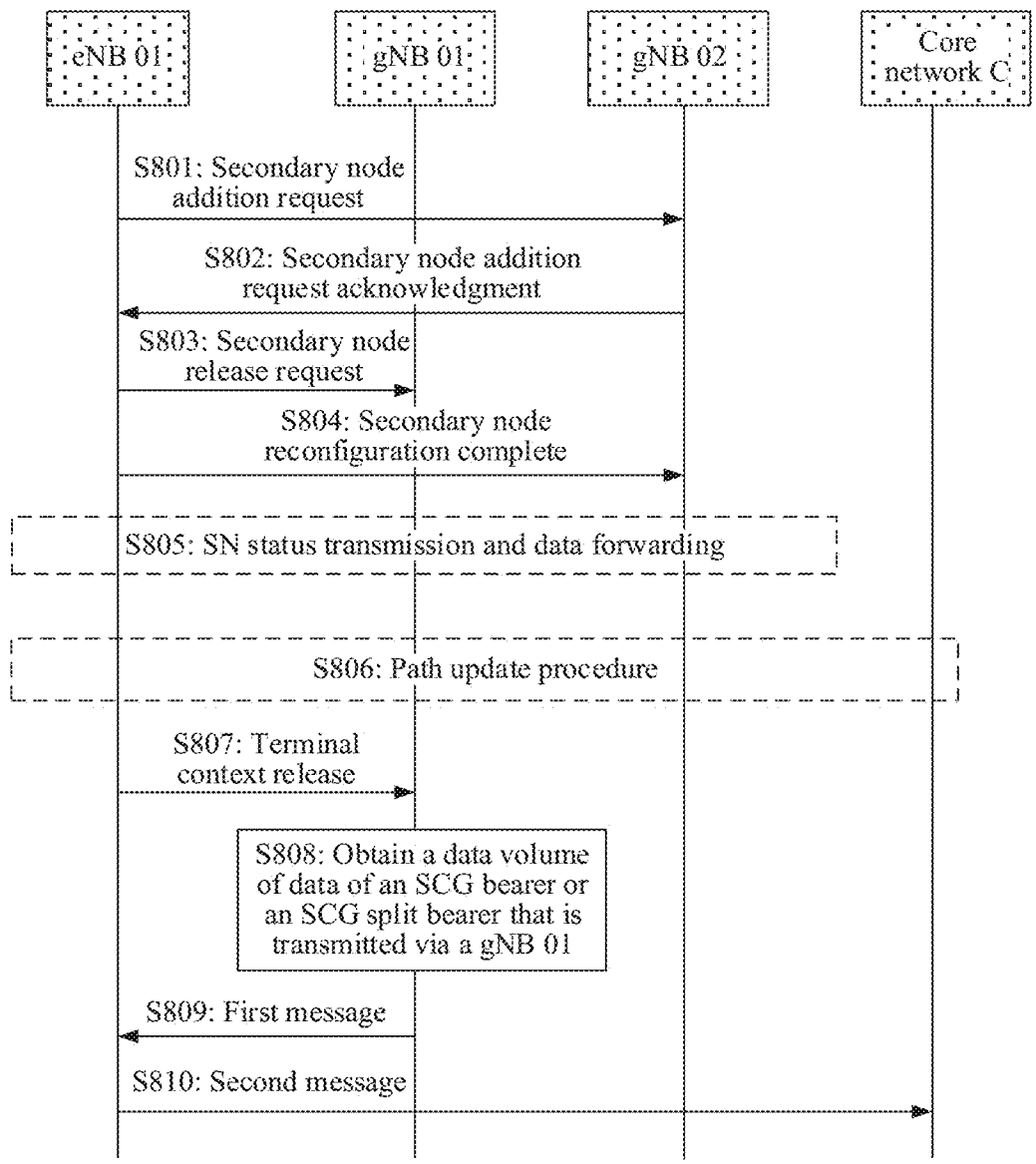
FIG. 8a is a flowchart of a method for calculating a data volume in an SCG split bearer or an SCG bearer according to this application.

As shown in FIG. 8a:

S801 to S806 show some signaling interaction processes for handing over the secondary node.

S801: The eNB 01 sends a secondary node addition request message to the gNB 02.

S802: The gNB 02 sends a secondary node addition request acknowledgment message to the eNB 01.

S803: The eNB 01 sends a secondary node release request message to the gNB 01.

S804: The eNB 01 sends a secondary node reconfiguration complete message to the gNB 02.

S805: The eNB 01, the gNB 01, and the gNB 02 complete SN status transmission and data forwarding.

S806: The eNB 01, the gNB 01, the gNB 02, and the core network C complete a path update procedure.

For S801 to S806, separately refer to, for example, related content of steps 1 to 3, 6, and 8a to 14 in FIG. 10.5.1-1 in Section 10.5.1 in 3GPP TS 37.340 V0.2.1.

S807 to S809 show that the source secondary node reports, to the master node, a data volume of data of the secondary bearer or the secondary split bearer that is transmitted via the source secondary node.

S807: The eNB 01 sends a terminal 01 context release message to the gNB 01, where the message includes information used to instruct the gNB 01 to send, to the eNB 01, the data volume of the data of the SCG bearer or the SCG split bearer that is transmitted via the gNB 01. Optionally, the message itself may be alternatively understood as an indication for instructing the gNB 01 to send, to the eNB 01, the data volume of the data of the SCG bearer or the SCG split bearer that is transmitted via the gNB 01.

Optionally, the foregoing indication may be alternatively performed via a newly added message.

S808: The gNB 01 counts the data volume of the data of the SCG bearer or the SCG split bearer that is transmitted via the gNB 01.

The data volume of the data of the SCG split bearer or the SCG bearer that is transmitted via the gNB 01 may be expressed as a data volume S.

In an example, referring to FIG. 5, in a scenario of the SCG split bearer, the data volume S may be at least one data volume of a data volume of data A-2 and a data volume of data B-2. Optionally, the data volume S may be a sum of a data volume of data A-2 and a data volume of data B-2.

Figure 8B:
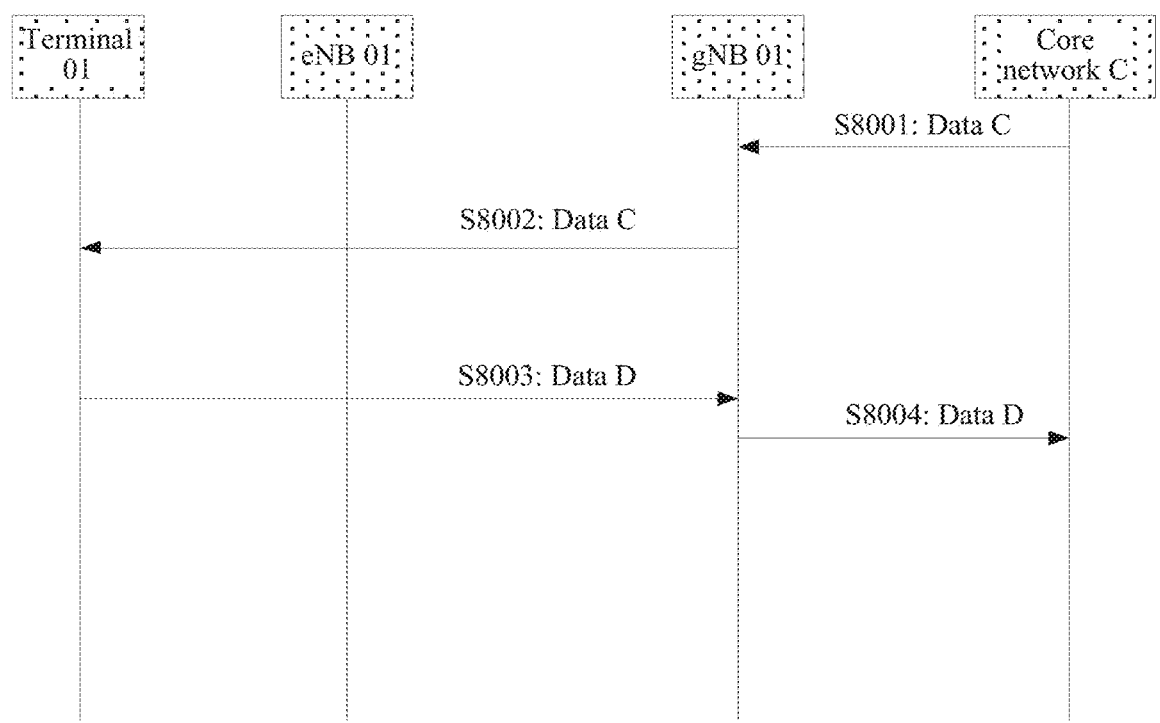
FIG. 8b is a schematic diagram of a data flow direction in an SCG bearer according to this application.

In another example, referring to FIG. 8b, in the SCG bearer, the data volume S may be at least one data volume of a data volume of data C sent by the gNB 01 to the terminal 01 and a data volume of data D sent by the terminal 01 to the gNB 01. Optionally, the data volume S may be a sum of the data volume of the data C and the data volume of the data D.

It may be understood that the data volume may be counted based on an uplink/downlink granularity.

The gNB 01 may count the data volume S after the data forwarding or the path update, so that it is ensured that the gNB 01 no longer performs data transmission with the terminal 01 when and after the gNB 01 counts the data volume S, thereby ensuring precision of the data volume.

Optionally, the data volume may be counted based on a bearer granularity, a session granularity, or a flow granularity. For related content, refer to related content of Example 1 to Example 3.

S809: The gNB 01 sends a first message to the eNB 01, where the first message includes first information, and the first information is used to indicate the data volume S. Optionally, similar to reporting a data volume by the master node to the core network, the secondary node may report the data volume to the master node based on a bearer granularity, a session granularity, or a flow granularity. In an example, the first message further includes one or more of a bearer identifier (namely, an identifier of the SCG bearer or the SCG split bearer), a session identifier, and a flow identifier that correspond to the data volume S. Specifically, a granularity of the data volume reported by the secondary node to the master node may be negotiated between the master node and the secondary node, or may be indicated by the core network C to the master node. For detailed descriptions of the foregoing related content, refer to related content of Example 1 to Example 3.

Optionally, the secondary node may report the data volume to the master node based on an uplinkdownlink granularity. For detailed descriptions of related content, refer to related content of Example 1 to Example 3.

According to S807 to S809, the master node may learn, before the secondary node is handed over, of the data volume of the data of the secondary bearer or the secondary split bearer that is transmitted via the source secondary node.

Optionally, the master node may accumulate, during a plurality of secondary node handovers, data volumes of data of the secondary bearer or the secondary split bearer that is transmitted via the source secondary nodes, and report the accumulated data volume when needing to report the data volume to the core network.

S810 shows that the master node reports a data volume to the core network.

S810: The eNB 01 sends a second message to the core network C, where the second message includes second information, and the second information is used to indicate a data volume of data of the SCG bearer or the SCG split bearer that is transmitted via the source secondary node.

Optionally, the data volume may be a data volume of data of the SCG bearer or the SCG split bearer that is transmitted via the source secondary node in a handover. For example, the data volume may be the data volume S.

Optionally, the data volume may be an accumulated value of data volumes of data of the SCG bearer or the SCG split bearer that is transmitted via a plurality of source secondary nodes in a plurality of handovers. For example, the accumulated value may be an accumulated value that is of a plurality of data volumes S received by the master node.

The core network C obtains the data volume of the data of the SCG bearer or the SCG split bearer that is transmitted via the source secondary node, and may obtain, based on a total data volume of data of the SCG bearer or the SCG split bearer, a data volume of data of the SCG bearer or the SCG split bearer that is transmitted via the master node.

Optionally, the eNB 01 may further report (for example, S810) a radio access technology of the gNB 01 to the core network C. For related content, refer to related content of Example 1 to Example 3.

Before the eNB 01 reports the data volume S to the core network C, a same bearer may be transferred between a plurality of gNBs. For example, the SCG or the SCG split bearer is initially established on the eNB 01 and the gNB 01, and then a handover from the gNB 01 occurs or the gNB 01 is released, or when the bearer on the gNB 01 is released due to a configuration modification, the gNB 01 sends, to the eNB 01, a data volume of the bearer that is transmitted via the gNB 01. Then, the eNB 01 migrates the bearer to another gNB, for example, a gNB 03. Subsequently, when a handover from the gNB 03 occurs or the gNB 03 is released, or when the bearer on the gNB 03 is released due to a configuration modification, the gNB 03 sends, to the eNB 01, a data volume of the bearer that is transmitted via the gNB 03. The eNB 01 may obtain a data volume that corresponds to the bearer and that corresponds to a radio access technology 1 of the gNB 01 and a data volume that corresponds to the bearer 1 and that corresponds to a radio access technology 2 of the gNB 02, and then report the data volumes to the core network C.

Optionally, before the eNB 01 reports the data volumes to the core network C (for example, S810), the process may further include: accumulating, by the eNB 01, data volumes for a same SCG or SCG split bearer of a same radio access technology; obtaining accumulated data volumes corresponding to different radio access technologies; and then reporting the data volumes to the core network C.

Optionally, for an occasion on which the master node reports the data volume to the core network C (for example, S810), there are a plurality of optional implementations. In a first optional implementation, S810 is performed after S809. In a second optional implementation, the master node may periodically send the second message to the core network C. In a third optional implementation, the master node may send the second message after receiving a request from the core network for reporting the secondary bearer or the secondary split bearer. In a fourth optional implementation, the master node may send the second message when an interface between the master node and the core network is released, when a connection between the master node and the core network is suspended, in a bearer deactivation procedure, or the like. It should be noted that one or more of the foregoing four implementations may all be deployed in the network. Optionally, the second message may be a message in the existing procedure, or may be a newly added message. For a specific occasion for reporting the data volume, refer to related descriptions of the reporting occasion in S510 in Example 1.

Optionally, the data volume S may be reported based on a bearer granularity, a session granularity, or a flow granularity. In an example, the second message further includes one or more of a bearer identifier (namely, an identifier of the SCG bearer or the SCG split bearer), a session identifier, and a flow identifier that correspond to the data volume. Specifically, a granularity of the data volume reported to the core network C may be indicated by the core network C to the master node. For detailed descriptions of the foregoing related content, refer to related content of Example 1 to Example 3.

Optionally, the data volume S may be reported based on an uplink/downlink granularity. For detailed descriptions of related content, refer to related content of Example 1 to Example 3.

Optionally, the second message may further include a bearer type of the SCG bearer or the SCG split bearer. For related content, refer to related content of Example 1 to Example 3.

Optionally, to help the core network C count the data volume, the second message in S810 further includes timestamps, and the timestamps are used to indicate a start time and an end time corresponding to the data volume reported in S810.

In an optional design, the counting of the data volume in Example 4 may exclude data header overheads, for example, header overheads of a protocol layer such as a PDCP layer, an RLC layer, a MAC layer, or an SDAP layer. According to the design, a data volume of an actual service can be precisely calculated, and user experience is better.

Optionally, the second message may further include, for example, the first information in S607 in Example 2, or the first information in S708 in Example 3. For related content, refer to Example 2 or Example 3.

For ease of understanding, the counting and reporting of the data volume of the secondary bearer and the secondary split bearer in Example 4 are further described below by using examples.

(1) For the Secondary Split Bearer

Referring to FIG. 5, for example, data A and data B are data of a session A. The session A includes a flow 1 and a flow 2. Data A-1 may include a part of data of the flow 1 (which is referred to as data A-1-f1 for short) and a part of data of the flow 2 (which is referred to as data A-1-f2 for short). The data A-2 may include a part of data of the flow 1 (which is referred to as data A-2-f1 for short) and a part of data of the flow 2 (which is referred to as data A-2-f2 for short). Data B-1 may include a part of data of the flow 1 (which is referred to as data B-1-f1 for short) and a part of data of the flow 2 (which is referred to as data B-142 for short). The data B-2 may include a part of data of the flow 1 (which is referred to as data B-2-f1 for short) and a part of data of the flow 2 (which is referred to as data B-2-f2 for short).

Optionally, according to a network requirement, in S808, the gNB 01 may count the data volume at a flow granularity or a session granularity. For example, at least one of an uplink data volume and a downlink data volume of the flow 1 carried by the SCG split bearer that are transmitted via the gNB 01 is counted; or at least one of an uplink data volume and a downlink data volume of the session A carried by the SCG split bearer that are transmitted via the gNB 01 is counted.

Optionally, according to a network requirement, in S809, the data volume S reported by the gNB 01 may be a data volume at a flow granularity or a data volume at a session granularity. The first message in S809 further includes the flow identifier or the session identifier corresponding to the data volume S. For example, the data volume S is a downlink data volume of the flow 1 (for example, a data volume of the data A-2-f1), and the flow identifier corresponding to the data volume S is a flow identifier of the flow 1; the data volume S is an uplink data volume of the flow 2 (for example, a data volume of the data B-2-f2), and the flow identifier corresponding to the data volume S is a flow identifier of the flow 2; the data volume S is a downlink data volume of the session A (for example, a data volume of the data A-2), and the session identifier corresponding to the data volume S is a session identifier of the session A; the data volume S is an uplink data volume of the session A (for example, a data volume of the data B-2), and the session identifier corresponding to the data volume S is the session identifier of the session A.

Optionally, according to a network requirement, in S810, the second message may further include at least one of a flow identifier or a session identifier corresponding to the reported data volume. If the first message obtained by the eNB 01 includes the data volume S and a session identifier, the second message may include the data volume S and the session identifier. If the first message obtained by the eNB 01 includes the data volume S and a flow identifier, the eNB 01 obtains, based on a correspondence between a session and a flow, a session identifier corresponding to the flow identifier, and the eNB 01 may report the session identifier. To be specific, the second message may include the data volume S, and at least one of the session identifier, or the flow identifier.

(2) For the Secondary Bearer

As shown in FIG. 8b, for example, the data C and the data D are data of a session C. The session C includes a flow 3 and a flow 4. The data C may include downlink data of the flow 3 and downlink data of the flow 4, and the data D may include uplink data of the flow 3 and uplink data of the flow 4.

Optionally, according to a network requirement, in S808, the gNB 01 may count the data volume at a flow granularity or a session granularity. For example, at least one of an uplink data volume and a downlink data volume of the flow 3 carried by the SCG bearer that are transmitted via the gNB 01 is counted; or at least one of an uplink data volume and a downlink data volume of the session C carried by the SCG bearer that are transmitted via the gNB 01 is counted.

Optionally, according to a network requirement, in S809, the data volume S reported by the gNB 01 may be a data volume at a flow granularity or a data volume at a session granularity. The first message in S809 further includes the flow identifier or the session identifier corresponding to the data volume S. For example, the data volume S is a downlink data volume of the flow 3 (for example, data C-f3), and the flow identifier corresponding to the data volume S is a flow identifier of the flow 3; the data volume S is an uplink data volume of the flow 4 (for example, data C-f4), and the flow identifier corresponding to the data volume S is a flow identifier of the flow 4; the data volume S is a downlink data volume of the session A (the data C), and the session identifier corresponding to the data volume S is the session identifier of the session A; the data volume S is an uplink data volume of the session A (the data D), and the session identifier corresponding to the data volume S is the session identifier of the session A.

Optionally, according to a network requirement, in S810, if the first message obtained by the eNB 01 includes the data volume S and a session identifier, the second message may include the data volume S and the session identifier. If the first message obtained by the eNB 01 includes the data volume S and a flow identifier, the second message may include the data volume S and the flow identifier. If the first message obtained by the eNB 01 includes the data volume S and a flow identifier, the eNB 01 obtains, based on a correspondence between a session and a flow, a session identifier corresponding to the flow identifier, and the eNB 01 may report the session identifier. To be specific, the second message may include the data volume S and the session identifier.

According to the foregoing method, the core network may learn, before a handover of the secondary node occurs, of the data volume of the data of the secondary bearer or the secondary split bearer that is transmitted via the source secondary node, thereby more precisely counting the data volume. In addition, the core network may learn, based on the data volume of the data of the secondary bearer or the secondary split bearer that is transmitted via the source secondary node, the data volume of the data of the secondary bearer or the secondary split bearer that is transmitted via the master node before the handover of the secondary node occurs, thereby more precisely counting the data volume.

Example 5

The master node A is an eNB 01, the secondary node B is a gNB 01, the core network C is an EPC or a 5GC, and the network establishes an SCG or an SCG split bearer for the terminal 01. The master node A remains unchanged, and the gNB 01 is released.

Figure 9:
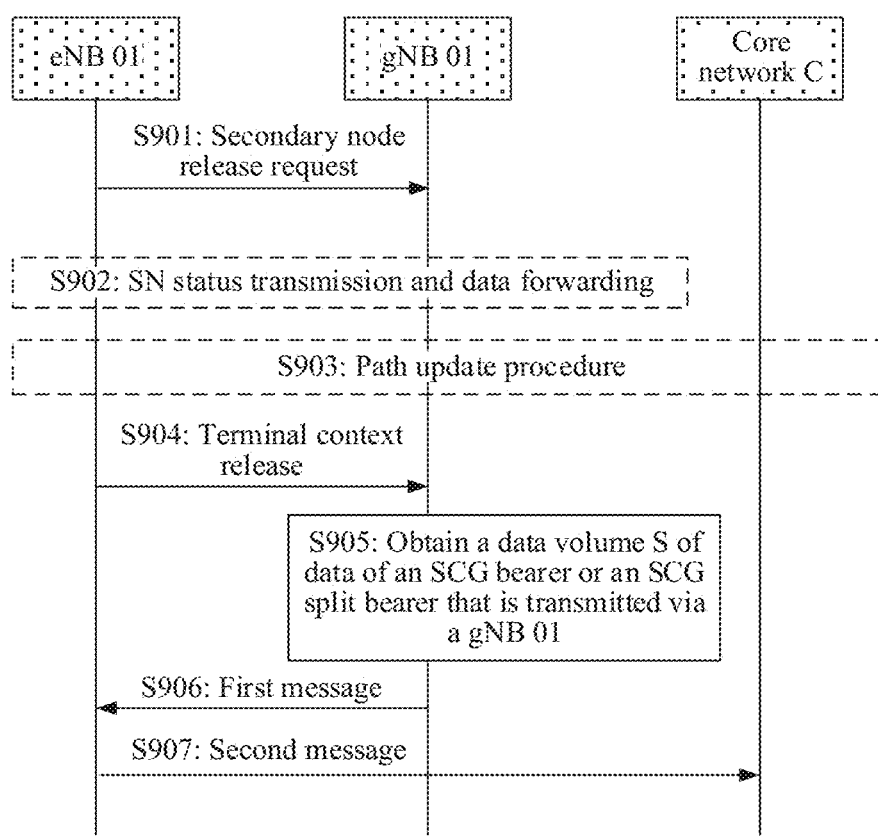
FIG. 9 is a flowchart of a method for calculating a data volume in an SCG split bearer or an SCG bearer according to this application.

As shown in FIG. 9:

S901 to S903 show some signaling interaction processes for releasing the secondary node. It should be noted that the processes or message names in the processes may vary with development of technologies or for different networks. This is not limited in this embodiment of this application.

S901: The eNB 01 sends a secondary node release request message to the gNB 01.

S902: The eNB 01 and the gNB 01 complete SN status transmission and data forwarding.

S903: The eNB 01, the gNB 01, and the core network C complete a path update procedure.

For S901 to S903, separately refer to, for example, related content of steps 1, 4, 5, and 6 in FIG. 10.4.1-1 in Section 10.4.1 in 3GPP TS 37.340 V0.2.1.

S904: The eNB 01 sends a terminal context release message to the gNB 01, where the message includes information used to instruct the gNB 01 to send, to the eNB 01, a data volume of data of the SCG bearer or the SCG split bearer that is transmitted via the gNB 01. Optionally, the message itself may be alternatively understood as an indication for instructing the gNB 01 to send, to the eNB 01, the data volume of the data of the SCG bearer or the SCG split bearer that is transmitted via the gNB 01.

Optionally, the foregoing indication may be alternatively performed via a newly added message.

S905: The gNB 01 obtains the data volume S of the data of the SCG bearer or the SCG split bearer that is transmitted via the gNB 01.

Optionally, the gNB 01 counts a data volume of each SCG bearer or each SCG split bearer on the gNB 01 that is transmitted via the gNB 01. In this case, the gNB 01 is released. Therefore, all bearers on the gNB 01 are released or migrated. The data volume of each SCG bearer or each SCG split bearer that is transmitted via the gNB 01 needs to be counted.

Optionally, the data volume S may be counted (for example, S905) based on an uplink/downlink granularity. For detailed descriptions of related content, refer to related content of Example 1 to Example 4.

Optionally, the counting of the data volume S (for example, S905) may exclude data header overheads. For detailed descriptions of related content, refer to related content of Example 1 to Example 4.

Optionally, the data volume S may be counted (for example, S905) based on a bearer granularity, a session granularity, or a flow granularity. For detailed descriptions of related content, refer to related content of Example 1 to Example 4.

When obtaining the data volume S, the gNB 01 already completes the data forwarding and the path update, so that it is ensured that the gNB 01 no longer performs data transmission with the terminal 01 when and after the gNB 01 obtains the data volume S, thereby ensuring precision of the data volume.

S906: The gNB 01 sends a first message to the eNB 01, where the first message includes the data volume S.

Before the gNB 01 is released, the gNB 01 reports the data volume of the data of the SCG bearer or the SCG split bearer that is transmitted via the gNB 01.

Optionally, the gNB 01 may report, to the eNB 01 (for example, S906), at least one of a bearer identifier, a flow identifier, or a session identifier that corresponds to the data volume S. For detailed descriptions of related content, refer to related content of Example 1 to Example 4.

S907: The eNB 01 sends a second message to the core network C, where the second message includes the data volume S.

The core network C obtains a data volume of data of the SCG bearer or the SCG split bearer that is transmitted via a secondary node, and obtains, in a scenario of the SCG split bearer based on a total data volume of data of the SCG split bearer, a data volume of data of the SCG split bearer that is transmitted via the master node.

Optionally, the eNB 01 may further report, to the core network C (for example, S907), at least one of the bearer identifier, the flow identifier, or the session identifier that corresponds to the data volume S. For detailed descriptions of related content, refer to related content of Example 1 to Example 4.

Optionally, the eNB 01 may further report (for example, S907) a radio access technology of the gNB 01 to the core network C. For detailed descriptions of related content, refer to related content of Example 1 to Example 4.

Optionally, before the eNB 01 reports the data volume to the core network C (for example, S907), the process may further include: accumulating, by the eNB 01, data volumes for a same SCG or SCG split bearer of a same radio access technology. For detailed descriptions of related content, refer to related content of Example 1 to Example 4.

Optionally, the eNB 01 may further report (for example, S907) timestamps to the core network C, and the timestamps are used to indicate a start time and an end time corresponding to the counting of the data volume S. For detailed descriptions of related content, refer to related content of Example 1 to Example 4.

Optionally, the eNB 01 may further report (for example, S907) a bearer type, for example, an SCG split bearer or an SCG bearer, to the core network C. For detailed descriptions of related content, refer to related content of Example 1 to Example 4.

Optionally, for an occasion on which the eNB 01 reports the data volume to the core network C (for example, S907), there may be several optional implementations. For detailed descriptions of related content, refer to related content of Example 1 to Example 4.

Example 6

The master node A is an eNB 01, the secondary node B is a gNB 01, the core network C is an EPC or a 5GC, and the network establishes an SCG or an SCG split bearer for the terminal 01. The eNB 01 or the gNB 01 may request to change a bearer type, to change the SCG bearer or the SCG split bearer to an MCG bearer.

As shown in FIG. 10:

Some signaling interaction processes for releasing the secondary node are shown. It should be noted that the processes or message names in the processes may vary with development of technologies or for different networks. This is not limited in this embodiment of this application.

S1001: The gNB 01 sends, to the eNB 01, a message for requesting to modify a secondary node configuration.

S1001 is optional, and the gNB 01 may actively initiate a gNB 01 configuration modification procedure.

S1002: The eNB 01 sends a secondary node configuration modification request message to the gNB 01, where the secondary node configuration modification request message is used to instruct the gNB 01 to send, to the eNB 01, a data volume of data of the SCG bearer or the SCG split bearer that is transmitted via the gNB 01.

Optionally, the change of the bearer type on the gNB 01 may be changes of bearer types of some bearers. Therefore, in this case, data volumes of data of the some bearers that is transmitted via the gNB 01 need to be counted. The secondary node configuration modification request may include at least one of bearer identifiers, session identifiers, or flow identifiers of the some bearers. For example, when the core network C is an EPC, the secondary node configuration modification request message may include the bearer identifiers; or when the core network is a 5GC, the secondary node configuration modification request message may include the session identifiers, the flow identifiers, or the like.

S1003: The gNB 01 obtains the data volume of the data of the SCG bearer or the SCG split bearer that is transmitted via the gNB 01.

Optionally, the gNB 01 obtains, based on at least one of a bearer identifier, a session identifier, or a flow identifier in the secondary node configuration modification request message, the corresponding data volume of the data of the SCG bearer or the SCG split bearer that is transmitted via the gNB 01.

Optionally, the data volume S may be counted (for example, S1003) based on an uplink/downlink granularity. For detailed descriptions of related content, refer to related content of Example 1 to Example 4.

Optionally, the counting of the data volume S (for example, S1003) may exclude data header overheads. For detailed descriptions of related content, refer to related content of Example 1 to Example 4.

Optionally, the data volume S may be counted (for example, S1003) based on a bearer granularity, a session granularity, or a flow granularity. For detailed descriptions of related content, refer to related content of Example 1 to Example 4.

Optionally, the gNB 01 no longer performs data transmission with the terminal 01 when and after obtaining the data volume S, thereby ensuring precision of the data volume.

S1004: The gNB 01 sends a secondary node configuration modification request acknowledgment message to the eNB 01, where the secondary node configuration modification request acknowledgment message includes the data volume S.

Optionally, the gNB 01 may report, to the eNB 01 (for example, S1004), at least one of a bearer identifier, a flow identifier, or a session identifier that corresponds to the data volume S. For detailed descriptions of related content, refer to related content of Example 1 to Example 4.

Optionally, the gNB 01 may further report (for example, S1004) timestamps to the eNB 01, and the timestamps are used to indicate a start time and an end time corresponding to the counting of the data volume S. For detailed descriptions of related content, refer to related content of Example 1 to Example 4.

S1005: The eNB 01 sends a second message to the core network C.

Optionally, for an occasion on which the eNB 01 reports the data volume to the core network C, there may be several optional implementations. For detailed descriptions of related content, refer to related content of Example 1 to Example 4.

S1006: The eNB 01 sends a secondary node reconfiguration complete message to the gNB 01.

S1007: The eNB 01 and the gNB 01 complete SN status transmission and data forwarding.

Data that is not successfully transmitted may be downlink data that is not sent by the eNB 01 to the terminal 01, uplink data that is not sent to the gNB 01, or the downlink data and the uplink data.

For S1001, S1002, and S1004 to S1007, separately refer to, for example, related content of steps 1, 2, 3, 6, 8, and 9 in FIG. 10.3.1-2 in Section 10.3.1 in 3GPP TS 37.340 V0.2.1.

S1008: The eNB 01 sends a bearer change indication message to the core network C.

Optionally, the second message in S1005 may be the bearer change indication message in S1007.

S1009: The core network C sends an end flag to the eNB 01.

S1010: The core network C sends a bearer change acknowledgment message to the eNB 01.

For S1009 and S1010, separately refer to, for example, related content of steps 11 and 12 in FIG. 10.2.1-1 in Section 10.2.1 in 3GPP TS 37.340 V0.2.1.

Optionally, the eNB 01 may further report, to the core network C, at least one of the bearer identifier, the flow identifier, or the session identifier that corresponds to the data volume S. For detailed descriptions of related content, refer to related content of Example 1 to Example 4.

Optionally, the eNB 01 may further report a radio access technology of the gNB 01 to the core network C. For detailed descriptions of related content, refer to related content of Example 1 to Example 4.

Optionally, before the eNB 01 reports the data volume to the core network C, the process may further include: accumulating, by the eNB 01, data volumes for a same SCG or SCG split bearer of a same radio access technology. For detailed descriptions of related content, refer to related content of Example 1 to Example 4.

Optionally, the eNB 01 may further report timestamps to the core network C, and the timestamps are used to indicate a start time and an end time corresponding to the counting of the data volume S. For detailed descriptions of related content, refer to related content of Example 1 to Example 4.

Optionally, the eNB 01 may further report a bearer type, for example, an SCG split bearer or an SCG bearer, to the core network C. For detailed descriptions of related content, refer to related content of Example 1 to Example 4.

Example 7

The master node A is an eNB 01, the secondary node B is a gNB 01, the core network C is an EPC or a 5GC, and the network establishes an SCG or an SCG split bearer for the terminal 01. The gNB 01 remains unchanged, and the master node A is handed over from the eNB 01 to an eNB 02.

Figure 11:
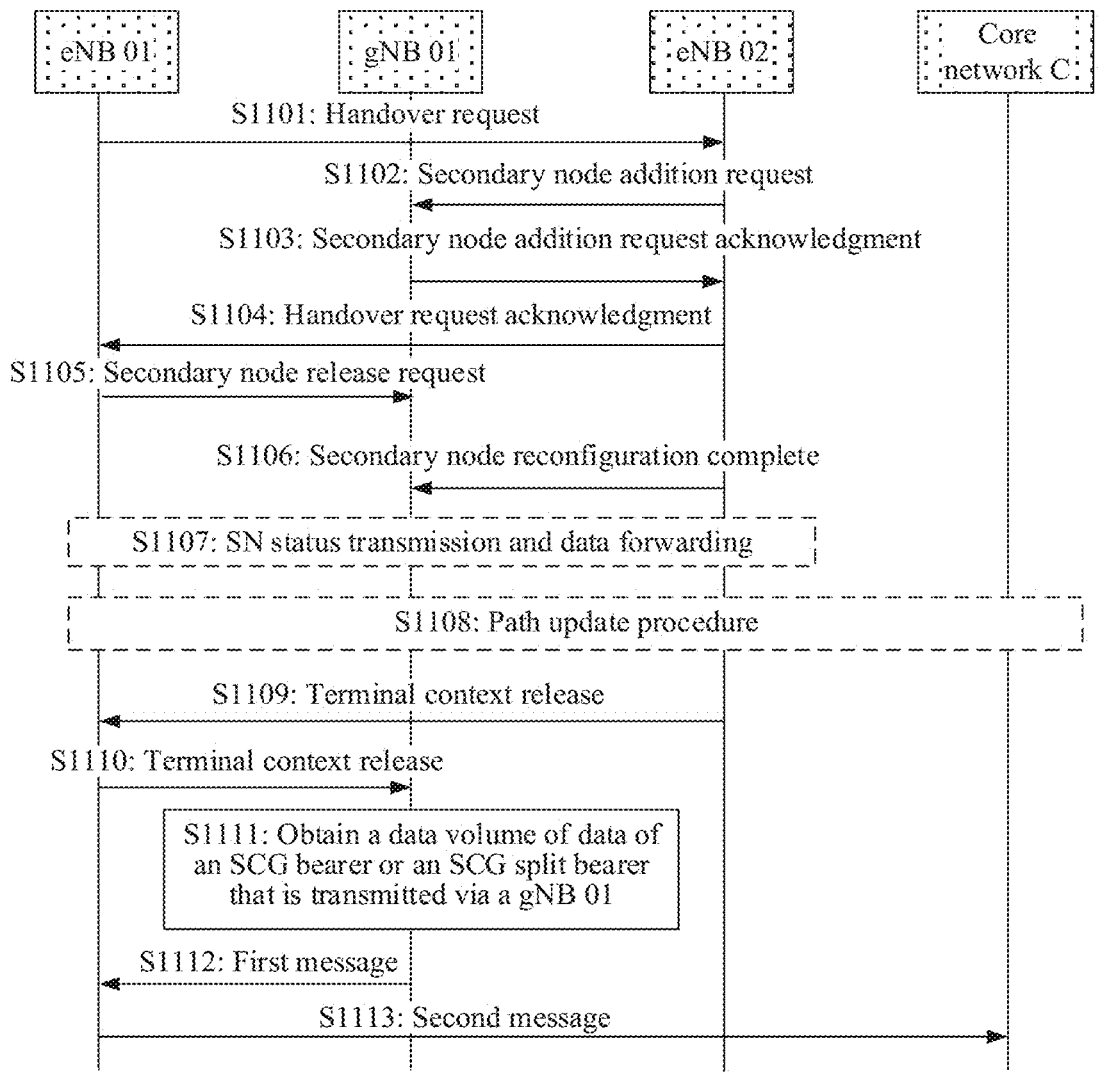
FIG. 11 is a flowchart of a method for calculating a data volume in an SCG split bearer or an SCG bearer according to this application.

As shown in FIG. 11:

S1101 to S1108 show some signaling interaction processes for releasing the secondary node. It should be noted that the processes or message names in the processes may vary with development of technologies or for different networks. This is not limited in this embodiment of this application.

S1101: The eNB 01 sends a handover request message to the eNB 02.

S1102: The eNB 02 sends a secondary node addition request message to the gNB 01.

S1103: The gNB 01 sends a secondary node addition request acknowledgment message to the eNB 02.

S1104: The eNB 02 sends a handover request acknowledgment message to the eNB 01.

S1105: The eNB 01 sends a secondary node release request message to the gNB 01.

S1106: The eNB 02 sends a secondary node reconfiguration complete message to the gNB 01.

S1107: The eNB 01, the gNB 01, and the eNB 02 complete SN status transmission and data forwarding.

S1108: The eNB 01, the gNB 01, the eNB 02, and the core network C complete a path update procedure.

S1109: The eNB 02 sends a terminal context release message to the eNB 01. The message is used to instruct the gNB 01 to send, to the eNB 01, the data volume of the data of the SCG bearer or the SCG split bearer that is transmitted via the gNB 01.

For S1101 to S1109, separately refer to, for example, related content of steps 1 to 5, and 10 to 17 in FIG. 10.7.1-1 in Section 10.7.1 in 3GPP TS 37.340 V0.2.1.

S1110: The eNB 01 sends a terminal context release message to the gNB 01, where the message is used to instruct the gNB 01 to send, to the eNB 01, the data volume of the data of the SCG bearer or the SCG split bearer that is transmitted via the gNB 01.

S1111: The gNB 01 obtains the data volume of the data of the SCG bearer or the SCG split bearer that is transmitted via the gNB 01 (namely, a data volume S).

Optionally, the data volume S may be counted (for example, S905) based on an uplink/downlink granularity. For detailed descriptions of related content, refer to related content of Example 1 to Example 4.

Optionally, the counting of the data volume S (for example, S905) may exclude data header overheads. For detailed descriptions of related content, refer to related content of Example 1 to Example 4.

Optionally, the data volume S may be counted (for example, S905) based on a bearer granularity, a session granularity, or a flow granularity. For detailed descriptions of related content, refer to related content of Example 1 to Example 4.

When obtaining the data volume S, the gNB 01 already completes the data forwarding and the path update, so that it is ensured that the gNB 01 no longer performs data transmission with the terminal 01 when and after the gNB 01 obtains the data volume S, thereby ensuring precision of the data volume.

S1112: The gNB 01 sends a first message to the eNB 01, where the first message includes the data volume S.

Optionally, the gNB 01 may report, to the eNB 01 (for example, S1112), at least one of a bearer identifier, a flow identifier, or a session identifier that corresponds to the data volume S. For detailed descriptions of related content, refer to related content of Example 1 to Example 4.

Optionally, the gNB 01 may further report (for example, S1112) timestamps to the eNB 01, and the timestamps are used to indicate a start time and an end time corresponding to the counting of the data volume S. For detailed descriptions of related content, refer to related content of Example 1 to Example 4.

S1113: The eNB 01 sends a second message to the core network C, where the second message includes the data volume S.

Optionally, the eNB 01 may further report, to the core network C (for example, S1113), at least one of the bearer identifier, the flow identifier, or the session identifier that corresponds to the data volume S. For detailed descriptions of related content, refer to related content of Example 1 to Example 4.

Optionally, the eNB 01 may further report (for example, S1113) a radio access technology of the gNB 01 to the core network C. For detailed descriptions of related content, refer to related content of Example 1 to Example 4.

Optionally, before the eNB 01 reports the data volume to the core network C (for example, S1113), the process may further include: accumulating, by the eNB 01, data volumes for a same SCG or SCG split bearer of a same radio access technology. For detailed descriptions of related content, refer to related content of Example 1 to Example 4.

Optionally, the eNB 01 may further report (for example, S1113) timestamps to the core network C, and the timestamps are used to indicate a start time and an end time corresponding to the counting of the data volume S. For detailed descriptions of related content, refer to related content of Example 1 to Example 4.

Optionally, the eNB 01 may further report (for example, S1113) a bearer type, for example, an SCG split bearer or an SCG bearer, to the core network C. For detailed descriptions of related content, refer to related content of Example 1 to Example 4.

Optionally, for an occasion on which the eNB 01 reports the data volume to the core network C (for example, S1113), there may be several optional implementations. For detailed descriptions of related content, refer to related content of Example 1 to Example 4.

Example 8

The master node A is an eNB 01, the secondary node B is a gNB 01, the core network C is an EPC or a 5GC, and the network establishes an SCG or an SCG split bearer for the terminal 01.

Figure 12A:
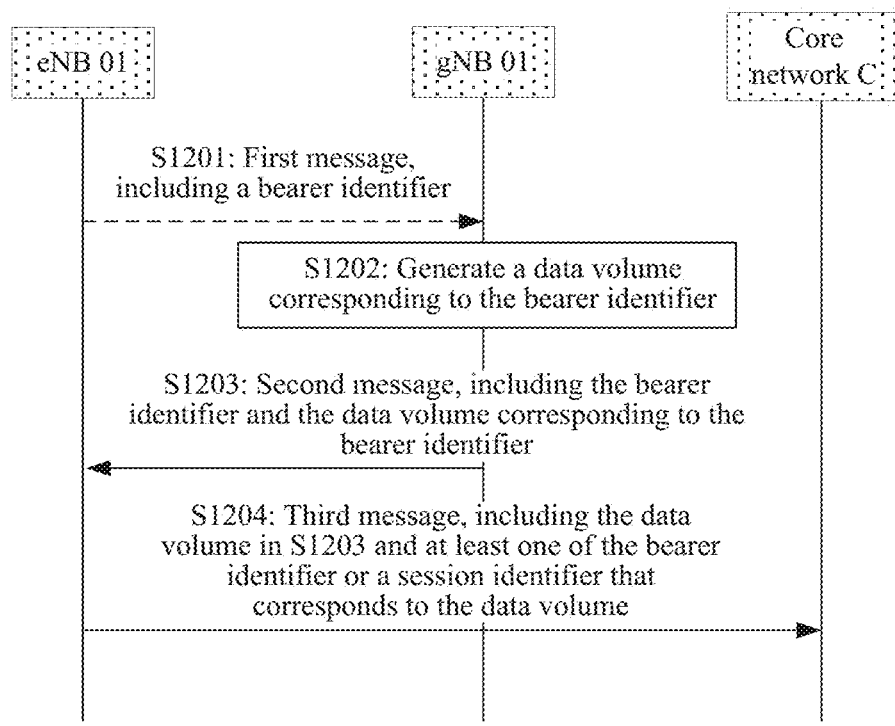
FIG. 12a is a flowchart of a method for calculating a data volume in an SCG split bearer or an SCG bearer according to this application.

As shown in FIG. 12a:

S1201 to S1203 may include a message in the existing procedure, or may be newly added messages. This is not limited in this embodiment.

S1201: The eNB 01 sends a first message to the gNB 01, where the message is used to instruct the gNB 01 to send, to the eNB 01, a data volume of data of the SCG bearer or the SCG split bearer that is transmitted via the gNB 01.

S1202: The gNB 01 obtains the data volume of the data of the SCG bearer or the SCG split bearer that is transmitted via the gNB 01.

Optionally, the data volume S may be counted (for example, S1202) based on an uplink/downlink granularity. For detailed descriptions of related content, refer to related content of Example 1 to Example 4.

Optionally, the counting of the data volume S (for example, S1202) may exclude data header overheads. For detailed descriptions of related content, refer to related content of Example 1 to Example 4.

Optionally, the data volume S may be counted (for example, S1202) based on a bearer granularity, a session granularity, or a flow granularity. For detailed descriptions of related content, refer to related content of Example 1 to Example 4.

Optionally, the gNB 01 no longer performs data transmission with the terminal 01 after obtaining the data volume S, thereby ensuring precision of the data volume.

S1203: The gNB 01 sends a second message to the eNB 01, where the second message includes the data volume S.

Optionally, the gNB 01 may report, to the eNB 01 (for example, S1203), at least one of a bearer identifier, a flow identifier, or a session identifier that corresponds to the data volume S. For detailed descriptions of related content, refer to related content of Example 1 to Example 4.

Optionally, the gNB 01 may further report (for example, S1203) timestamps to the eNB 01, and the timestamps are used to indicate a start time and an end time corresponding to the counting of the data volume S. For detailed descriptions of related content, refer to related content of Example 1 to Example 4.

S1204: The eNB 01 sends a third message to the core network C, where the third message includes the data volume, and at least one of the bearer identifier or the session identifier that corresponds to the data volume.

Optionally, the eNB 01 may further report, to the core network C (for example, S1204), at least one of the bearer identifier, the flow identifier, or the session identifier that corresponds to the data volume S. For detailed descriptions of related content, refer to related content of Example 1 to Example 4.

Optionally, the eNB 01 may further report (for example, S1204) a radio access technology of the gNB 01 to the core network C. For detailed descriptions of related content, refer to related content of Example 1 to Example 4.

Optionally, before the eNB 01 reports the data volume to the core network C (for example, S1204), the process may further include: accumulating, by the eNB 01, data volumes for a same SCG or SCG split bearer of a same radio access technology. For detailed descriptions of related content, refer to related content of Example 1 to Example 4.

Optionally, the eNB 01 may further report (for example, S1204) timestamps to the core network C, and the timestamps are used to indicate a start time and an end time corresponding to the counting of the data volume S. For detailed descriptions of related content, refer to related content of Example 1 to Example 4.

Optionally, the eNB 01 may further report (for example, S1204) a bearer type, for example, an SCG split bearer or an SCG bearer, to the core network C. For detailed descriptions of related content, refer to related content of Example 1 to Example 4.

Optionally, for an occasion on which the eNB 01 reports the data volume to the core network C (for example, S1204), there may be several optional implementations. For detailed descriptions of related content, refer to related content of Example 1 to Example 4.

It should be noted that Solution 3 is also applicable to the secondary bearer or the secondary split bearer. For example, the master node A is a gNB, the secondary node B is an eNB, and the core network C is an EPC or a 5GC; or the master node A is an eNB, the secondary node B is a WT, and the core network C is an EPC; or the master node A is a gNB, the secondary node B is a WT, and the core network C is a 5GC. This is not limited in this embodiment of this application.

The method provided in Solution 3 is described below separately from a perspective of a master node side, a perspective of a secondary node side, and a perspective of a core network side.

The following is the method of Solution 3 that is described from the perspective of the master node side. The method M5 includes the following steps.

M501: When a bearer on the secondary node is released, the secondary node obtains a data volume of the secondary bearer or the secondary split bearer that is transmitted via the secondary node.

For related descriptions of M501, refer to S808, S905, S1003, S111, and S1202.

M502: The secondary node sends a first message to the master node, where the first message is used to indicate the data volume of the secondary bearer or the secondary split bearer that is transmitted via the secondary node.

For related descriptions of M502, refer to S809, S906, S1004, S1112, and S1203.

The following is the method of Solution 3 that is described from the perspective of the master node side. The method M6 includes the following steps.

M601: When a bearer on the secondary node is released, the master node receives a first message sent by the secondary node, where the first message includes information used to indicate a data volume of data of the secondary bearer or the secondary split bearer that is transmitted via the secondary node.

For related descriptions of M601, refer to S808, S905, S1003, S1111, and S1202.

M602: The master node sends a second message to the core network, where the first message includes the information used to indicate the data volume of the data of the secondary bearer or the secondary split bearer that is transmitted via the secondary node.

For related descriptions of M602, refer to S810, S907, S1005, S1113, and S1204.

The following is the method of Solution 3 that is described from the perspective of the core network side. The method M7 includes the following steps.

M701: When a bearer on the secondary node is released, a network element in the core network receives a second message from the master node, where the second message includes information used to indicate a data volume of data of the secondary bearer or the secondary split bearer that is transmitted via the secondary node.

For related descriptions of M701, refer to S810, S907, S1005, S1113, and S1204.

M702: The network element in the core network obtains, based on a data volume of transmitted data of the secondary bearer or the secondary split bearer and the data volume of the data of the secondary bearer or the secondary split bearer that is transmitted via the secondary node, information about a data volume of data of the secondary split bearer that is transmitted via the master node.

Figure 14:
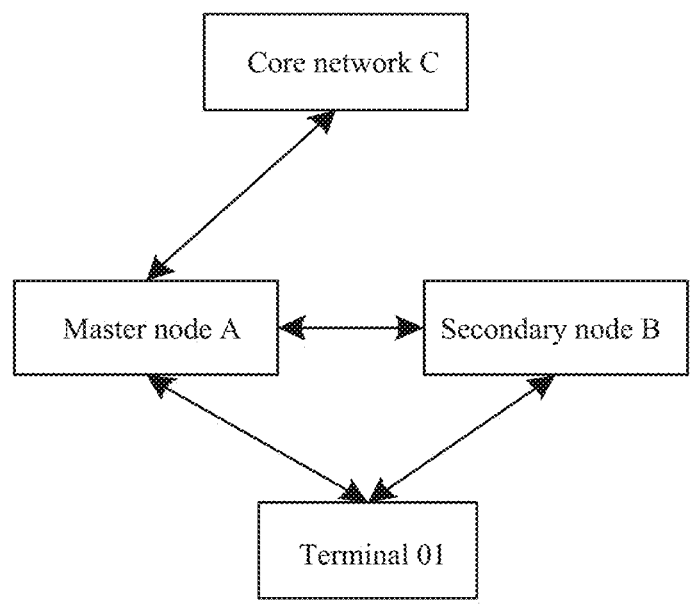
FIG. 14 is a schematic diagram of a master split bearer according to this application.

It should be noted that Solution 3 is also applicable to a master split bearer. FIG. 14 is a schematic diagram of a master split bearer. As shown in FIG. 14, a user plane connection between a core network C and a master node A is established for a terminal 01, a user plane connection is established between the master node A and the terminal 01, and a user plane connection is established between a secondary node B and the terminal 01. When there is downlink data, the core network C sends all data of the bearer to the master node A, the master node A sends a part of the data to the secondary node B, the secondary node B sends the part of the data to the terminal 01, and the master node A sends remaining data to the terminal 01. When there is uplink data, the terminal 01 may send a part of data of the bearer to the master node A, the terminal 01 sends remaining data of the bearer to the secondary node B, the secondary node B sends the remaining data to the master node A, and the master node A sends all of the received data of the bearer to the core network C. Optionally, it may be configured that the terminal 01 sends all the data of the bearer to the secondary node B, and the secondary node B sends all the data of the bearer to the master node A; or it may be configured that the terminal 01 sends all the data of the bearer to the master node A. For related content of the master split bearer, for example, refer to related content of Section 4.2.2 in 3GPP TS 37.340 V0.2.1.

In Solution 3, similarly, the secondary node B may send, to the master node A, a data volume of the master split bearer that is transmitted via the secondary node B, and the master node A reports the data volume to the core network C. The core network may learn of, according to the data volume of the master split bearer that is transmitted via the secondary node B, a data volume of the bearer that is transmitted via the master node A, thereby precisely counting the data volume.

In an example, in Solution 1 to Solution 3, the master node A may report the data volume to the core network C based on the examples shown in Table 1 to Table 6.

TABLE 1

| Bearer identifier | Data volume |
| --- | --- |
| Bearer 1 | Data volume M1 |
| Bearer 2 | Data volume M2 |

TABLE 1-continued

| Bearer identifier | Data volume |
| --- | --- |
| Bearer 3 | Data volume M3 |
| ... | ... |

TABLE 2

| Session identifier | Data volume |
| --- | --- |
| Session 1 | Data volume 1 |
| Session 2 | Data volume 2 |
| Session 3 | Data volume 3 |
| ... | ... |

TABLE 3

| Flow identifier | Data volume |
| --- | --- |
| Flow 1 | Data volume 1 |
| Flow 2 | Data volume 2 |
| Flow 3 | Data volume 3 |
| ... | ... |

TABLE 4

| Bearer identifier | Radio access technology | Data volume |
| --- | --- | --- |
| Bearer 1 | Radio access technology 1 | Data volume 1 |
| Bearer 1 | Radio access technology 2 | Data volume 2 |
| Bearer 2 | Radio access technology 1 | Data volume 3 |
| Bearer 2 | Radio access technology 2 | Data volume 4 |
| Bearer 2 | Radio access technology 3 | Data volume 5 |

TABLE 5

| Flow identifier | Radio access technology | Data volume |
| --- | --- | --- |
| Flow 1 | Radio access technology 1 | Data volume 1 |
| Flow 1 | Radio access technology 2 | Data volume 2 |
| Flow 2 | Radio access technology 1 | Data volume 3 |
| Flow 2 | Radio access technology 2 | Data volume 4 |
| Flow 2 | Radio access technology 3 | Data volume 5 |

TABLE 6

| Session identifier | Radio access technology | Data volume |
| --- | --- | --- |
| Session 1 | Radio access technology 1 | Data volume 1 |
| Session 1 | Radio access technology 2 | Data volume 2 |
| Session 2 | Radio access technology 1 | Data volume 3 |
| Session 2 | Radio access technology 2 | Data volume 4 |
| Session 2 | Radio access technology 3 | Data volume 5 |

The methods provided in the embodiments of this application are described above with reference to Solution 1 to Solution 3 (which are referred to as method embodiments below). Communications apparatuses provided in the embodiments of this application are further described below.

Figure 12B:
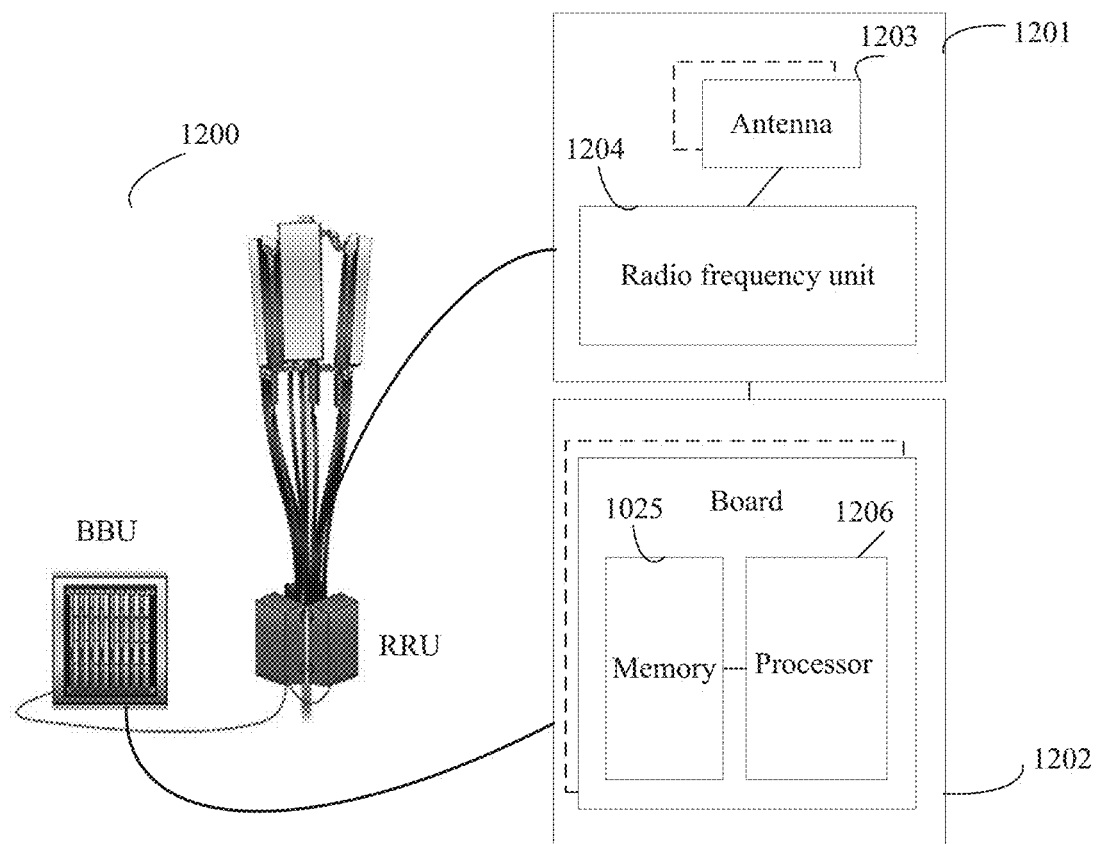
FIG. 12b is a communications apparatus according to this application.

An embodiment of this application provides a network device 1200. The network device may be the secondary node B in the network shown in FIG. 1, and may perform the method performed by the secondary node B. As shown in FIG. 12b:

The network device 1200 includes one or more remote radio units (English: remote radio unit, RRU for short) 1201 and one or more baseband units (English: baseband unit, BBU for short) 1202. The RRU 1201 may be referred to as a transceiver unit, a transceiver machine, a transceiver circuit, a transceiver, or the like. The RRU 1201 may include at least one antenna 1203 and a radio frequency unit 1204. The RRU 1201 is partially configured to: perform radio frequency signal sending and receiving and perform conversion between a radio frequency signal and a baseband signal. The BBU 1202 is partially configured to: perform baseband processing, control the network device, and the like. The RRU 1201 and the BBU 1202 may be physically disposed together; or may be physically disposed separately, that is, the network device 1200 is a distributed network device.

The BBU 1202 is a control center of the network device, and may also be referred to as a processing unit. The BBU 1202 is mainly configured to perform a baseband processing function such as channel encoding, multiplexing, modulation, and spectrum spreading. For example, the BBU (processing unit) may be configured to control the network device to perform the method performed by the secondary node B in the foregoing method embodiments.

In an example, the BBU 1202 may include one or more boards. A plurality of boards may together support a radio access network having a single radio access technology (for example, an LTE network or an NR network), or may separately support a radio access network having different radio access technologies (for example, an LTE network, an NR network, or another network). The BBU 1202 further includes a memory 1025 and a processor 1206. The memory 1025 is configured to store necessary instructions and necessary data. The processor 1206 is configured to control the network device to perform a necessary action, for example, control the network device to perform the method performed by the secondary node B in the foregoing method embodiments. The memory 1025 and the processor 1206 may serve the one or more boards. In other words, the memory and the processor may be disposed independently on each board. Alternatively, a plurality of boards may share a same memory and a same processor. In addition, a necessary circuit may be further disposed on each board.

In uplink, an uplink signal (including data and the like) sent by a terminal device is received via the antenna 1203. In downlink, a downlink signal (including data and/or control information) is sent to the terminal device via the antenna 1203. The processor 1206 processes service data and a signaling message. These units perform processing based on radio access technologies (for example, LTE, NR, and an access technology of another evolved system) used in a radio access network. The processor 1206 is further configured to control and manage an action of the network device, and is configured to perform the processing performed by the secondary node B in the foregoing method embodiments.

It may be understood that FIG. 12b merely shows a simplified design of the network device. In actual application, the network device may include any quantity of antennas, memories, processors, radio frequency units, RRUs, BBUs, and the like. All network devices that can implement this application fall within the protection scope of this application.

An embodiment of this application provides another communications apparatus 1300. The communications apparatus may perform the method performed by the master node A in the foregoing method embodiments.

Figure 13:
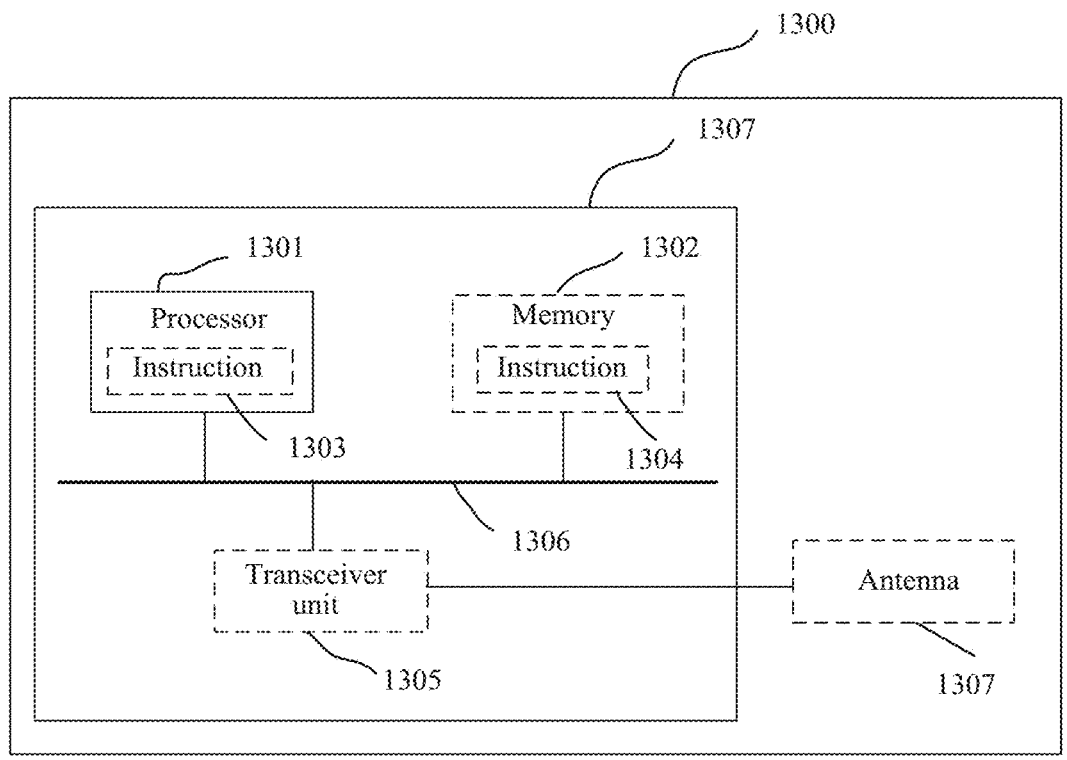
FIG. 13 is another communications apparatus according to this application.

As shown in FIG. 13:

The communications apparatus 1300 includes a processing system 1307, configured to perform the method M1, M3, or M5 performed by the master node A in the foregoing method embodiments. The processing system 1307 may be a circuit, and the circuit may be implemented by a chip.

The processing system 1307 includes one or more processors 1301. The processor 1301 may be a general-purpose processor or a dedicated processor, for example, may be a baseband processor or a central processing unit. The processor 1301 may alternatively integrate a function of a baseband processor or a central processing unit. The baseband processor is mainly configured to process a communication protocol and communication data. The baseband processor may also be referred to as a baseband processing circuit or a baseband processing chip. The central processing unit is mainly configured to: control the entire communications apparatus (for example, a chip, a network device, or a terminal device), execute a software program, and process data of the software program. The central processing unit may also be referred to as a central processing circuit or a central processing chip. The one or more processors 1301 may perform the method M1, M3, or M5.

The processor 1301 may be any one of the following components having a calculation processing capability: a central processing unit (English: Central Processing Unit, CPU for short), an ARM processor (English full name of AMR is: Advanced RISC Machines, and English full name of RISC is: Reduced Instruction Set Computing, translated into Reduced Instruction Set Computing in Chinese), a field programmable gate array (English: Field Programmable Gate Array, FPGA for short), and a dedicated processor. Optionally, the processor 1301 may be integrated as a many-core processor.

In an optional design, the processor 1301 may include instructions 1303, and the instructions 1303 may be run on the processor 1301, so that the communications apparatus 1300 performs the method M1, M3, or M5.

In an optional design, the processing system 1307 may include one or more memories 1302, and the memory 1302 is connected to the processor 1303 via a bus 1306. The memory 1302 store instructions 1304, and the instructions 1304 may be run on the processor 1301, so that the communications apparatus 1300 performs the method M1, M3, or M5. Optionally, the memory 1302 may further store data. Optionally, the processor 1301 may further store instructions and/or data. For example, the one or more memories 1302 may store instructions and data in the foregoing method embodiments. The processor 1301 and the memory 1302 may be separately disposed, or may be integrated together.

The memory 1302 may be any one or any combination of the following storage media: a random access memory (English: Random Access Memory, RAM for short), a read-only memory (English: read only memory, ROM for short), a non-volatile memory (English: non-volatile memory, NVM for short), a solid state drive (English: Solid State Drive, SSD for short), a mechanical hard disk, a magnetic disk, a disk array, and the like.

The bus 1306 may include an address bus, a data bus, a control bus, and the like. For ease of denotation, the bus is represented by using a bold line in FIG. 13. The bus 1306 may be any one or any combination of the following components for wired data transmission: an industry standard architecture (English: Industry Standard Architecture, ISA for short) bus, a peripheral component interconnect (English: Peripheral Component Interconnect, PCI for short)

bus, an extended industry standard architecture (English: Extended Industry Standard Architecture, EISA for short) bus, and the like.

In an optional design, the processing system 1307 may further include a transceiver unit 1305, and the transceiver unit 1305 is connected to the processor 1303 via the bus 1306. The transceiver unit 1305 may be an input/output circuit of the chip, and the transceiver unit 1305 may exchange data with another communications unit (for example, a radio frequency chip or another unit in the network device).

In an optional design, the communications apparatus 1300 may further include an antenna 1307, and the antenna 1307 may be connected to the transceiver unit 1305. The communications apparatus 1300 may be a network device (for example, the master node A). The transceiver unit 1305 may be a radio frequency unit. The transceiver unit 1305 may implement data exchange between the communications apparatus 1300 and another device via the antenna 1307. For example, when the communications apparatus 1300 is the master node A, the transceiver unit 1305 of the communications apparatus 1300 may exchange data with a secondary node B via the antenna 1307.

In an optional design, the processor 1301 may be considered as a processing unit, and the memory 1302 may be considered as a storage unit. The communications apparatus 1300 may include a processing unit. The communications apparatus 1300 may further include at least one of the storage unit or the transceiver unit.

An embodiment of this application further provides a computer-readable storage medium. All or some of the methods described in the foregoing method embodiments may be implemented by using software, hardware, firmware, or any combination thereof. If functions are implemented in software, the functions may be used as one or more instructions or code stored on the computer-readable medium or transferred over the computer-readable medium. The computer-readable medium may include a computer storage medium and a communications medium, and may further include any medium that enables a computer program to be transmitted from one place to another. The storage medium may be any available medium that can be accessed by a computer.

In an optional design, the computer-readable medium may include a RAM, a ROM, an EEPROM, a CD-ROM or another compact disc memory, a magnetic disk memory or another magnetic disk storage device, or any other medium that can be used to carry or store expected program code in a form of an instruction or a data structure and that can be accessed by a computer. In addition, any connection may be appropriately referred to as a computer-readable medium. For example, if software is transmitted from a website, a server, or another remote source by using a coaxial cable, an optical fiber cable, a twisted pair, a digital subscriber line (DSL), or a radio technology (such as infrared, radio, and microwave), the coaxial cable, the optical fiber cable, the twisted pair, the DSL, or the radio technology such as infrared, radio, and microwave is included in a definition of the medium. The magnetic disk and the compact disc used in this specification include a compact disc (CD), a laser disk, an optical disc, a digital versatile disc (DVD), a floppy disk, and a Blu-ray disc. The magnetic disk usually magnetically reproduces data, and the compact disc optically reproduces data by using laser. The foregoing combination should also be included in the scope of the computer-readable medium.

An embodiment of this application further provides a computer program product. All or some of the methods described in the foregoing method embodiments may be implemented by using software, hardware, firmware, or any combination thereof. When the methods are implemented in software, all or some the methods may be implemented in a form of a computer program product. The computer program product includes one or more computer instructions. When the computer program instructions are loaded and executed on a computer, all or some of the procedures or functions according to the foregoing method embodiments are generated. The foregoing computer may be a general-purpose computer, a dedicated computer, a computer network, a network device, user equipment, or another programmable apparatus.

What is claimed is:

1. A method, comprising:
   receiving, by a core network device a message indicating a first data volume of first data transmitted between a second network device and a terminal device;
   determining, by the core network device, a total data volume of total data transmitted between a first network device and a core network comprising the core network device or total data transmitted between a second network device and the core network; and
   determining, by the core network device, a second data volume of second data transmitted between the first network device and the terminal device based on the first data volume and the total data volume, wherein the first data, the second data and the total data are: (1) data of a bearer, (2) data of a flow, or (3) data of a session.

2. The method according to claim 1, wherein the method further comprises:
   charging, by the core network device, a service fee associated with the terminal device based on the first data volume and the second data volume.

3. The method according to claim 1, wherein the message comprises a first timestamp and a second timestamp, the first timestamp indicates a start time for counting the first data volume, and the second timestamp indicates an end time for counting the first data volume.

4. The method according to claim 1, wherein the first data comprises one or both of first downlink data or first uplink data between the second network device and the terminal device.

5. The method according to claim 1, wherein the second data comprises one or both of second downlink data or second uplink data between the first network device and the terminal device.

6. The method according to claim 1, wherein the first data, the second data, and the total data are data of a secondary cell group (SCG) split bearer, or a master split bearer established between the core network device and the first network device.

7. The method according to claim 1, wherein the message further comprises an identifier of the bearer, an identifier of the flow, or an identifier of the session.

8. The method according to claim 1, wherein the first network device adopts a first radio access technology standard to transmit the second data, the second network device adopts a second radio access technology standard to transmit the first data.

9. The method according to claim 1, wherein the first data volume is absent of overheads associated with: (1) a packet data convergence protocol (PDCP) header, (2) a radio link control (RLC) header, (3) a media access control (MAC) header, and a (4) service data adaptation protocol (SDAP) header.

10. The method according to claim 1, wherein the first data volume is absent of overheads associated with: (1) a packet data convergence protocol (PDCP) header, (2) a radio link control (RLC) header, and (3) a media access control (MAC) header.

11. The method according to claim 1, wherein the message comprises an identifier identifying a radio access technology standard adopted by the second network device.

12. The method according to claim 1, wherein the core network device periodically receives the message.

13. A communications apparatus comprising at least one processor, wherein the at least one processor is communicably coupled to a non-transitory computer-readable storage medium storing programming instructions for execution by the at least one processor, the programming instructions instruct the at least one processor to:
  receive a message indicating a first data volume of first data transmitted between a second network device and a terminal device;
  determine a total data volume of total data transmitted between a first network device and a core network comprising the core network device or total data transmitted between a second network device and the core network; and
  determine a second data volume of second data transmitted between a first network device and the terminal device, based on the first data volume and the total data volume, wherein the first data, the second data and the total data are data: (1) of a bearer, (2) data of a flow, or (3) data of a session.

14. The apparatus according to claim 13, the programming instructions further instruct the at least one processor to charge a service fee associated with the terminal device based on the first data volume and the second data volume.

15. The apparatus according to claim 13, wherein the message comprises a first timestamp and a second timestamp, the first timestamp indicates a start time for counting the first data volume, and the second timestamp indicates an end time for counting the first data volume.

16. The apparatus according to claim 13, wherein the first data comprises one or both of first downlink data or first uplink data between the second network device and the terminal device.

17. The apparatus according to claim 13, wherein the second data comprises one or both of second downlink data or second uplink data between the first network device and the terminal device.

18. The apparatus according to claim 13, wherein the first data, the second data, and the total data are data of a secondary cell group (SCG) split bearer, or a master split bearer established between the communications apparatus and the first network device.

19. The apparatus according to claim 13, wherein the message further comprises an identifier of the bearer, an identifier of the flow, or an identifier of the session.

20. The apparatus according to claim 13, wherein the first network device adopts a first radio access technology standard to transmit the second data, the second network device adopts a second radio access technology standard to transmit the first data.

21. The apparatus according to claim 13, wherein the first data volume is absent of overheads associated with: (1) a packet data convergence protocol (PDCP) header, (2) a radio link control (RLC) header, (3) a media access control (MAC) header, and (4) a service data adaptation protocol (SDAP) header.

22. The apparatus according to claim 13, wherein the first data volume is absent of overheads associated with: (1) a packet data convergence protocol (PDCP) header, (2) a radio link control (RLC) header and (3) a media access control (MAC) header.

23. The apparatus according to claim 13, wherein the message comprises an identifier identifying a radio access technology standard adopted by the second network device.

24. The apparatus according to claim 13, the programming instructions further instruct the at least one processor to periodically receive the message.

* * * * *

UNITED STATES PATENT AND TRADEMARK OFFICE
CERTIFICATE OF CORRECTION

PATENT NO. : 11,412,414 B2
APPLICATION NO. : 16/916529
DATED : August 9, 2022
INVENTOR(S) : Wenjie Peng, Hongzhuo Zhang and Mingzeng Dai Page 1 of 1

It is certified that error appears in the above-identified patent and that said Letters Patent is hereby corrected as shown below:

In the Claims

Column 35 / Line 2 - In Claim 9, delete "a (4)" and insert -- (4) a --.

Column 35 / Line 33 - In Claim 13, delete "are data: (1)" and insert -- are: (1) data --.

Signed and Sealed this
Twenty-fifth Day of April, 2023

Katherine Kelly Vidal
*Director of the United States Patent and Trademark Office*